United States Patent
Kusaka et al.

(10) Patent No.: US 10,145,289 B2
(45) Date of Patent: Dec. 4, 2018

(54) ENGINE DEVICE

(71) Applicant: YANMAR CO., LTD., Osaka-shi, Osaka (JP)

(72) Inventors: Hokuto Kusaka, Osaka (JP); Kazuyuki Miyazaki, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 32 days.

(21) Appl. No.: 15/269,722

(22) Filed: Sep. 19, 2016

(65) Prior Publication Data
US 2017/0009636 A1 Jan. 12, 2017

Related U.S. Application Data

(63) Continuation of application No. PCT/JP2015/056378, filed on Mar. 4, 2015.

(30) Foreign Application Priority Data

Mar. 19, 2014 (JP) .................. 2014-056917

(51) Int. Cl.
*F01N 11/00* (2006.01)
*F01N 3/021* (2006.01)
(Continued)

(52) U.S. Cl.
CPC ............ *F01N 11/005* (2013.01); *F01N 3/021* (2013.01); *F01N 3/035* (2013.01); *F01N 3/103* (2013.01); *F01N 3/106* (2013.01); *F01N 11/002* (2013.01); *F01N 13/008* (2013.01); *F01N 13/0097* (2014.06); *F01N 13/18* (2013.01); *F01P 5/02* (2013.01); *F02F 1/24* (2013.01);
(Continued)

(58) Field of Classification Search
CPC .......... F01N 3/021; F01N 3/035; F01N 3/103; F01N 3/106; F01N 11/002; F01N 11/005; F01N 13/008; F01N 13/0097; F01N 13/18; F01N 2340/04; F01N 2560/06; F01N 2560/08; F01N 2570/10; F01N 2570/12; F01N 2590/08; F01N 2900/1602; F01P 5/02; F02F 1/24; F02D 2200/0802; F02D 2200/0812; F02D 2400/22; Y02T 10/20; Y02T 10/47
See application file for complete search history.

(56) References Cited

U.S. PATENT DOCUMENTS

| | | | |
|---|---|---|---|
| 2008/0142657 A1* | 6/2008 | Ammer | B60K 13/04 248/219.1 |
| 2013/0008528 A1* | 1/2013 | Mitsuda | B01D 53/9477 137/343 |
| 2013/0014495 A1 | 1/2013 | Mosso et al. | |

FOREIGN PATENT DOCUMENTS

| | | |
|---|---|---|
| CN | 102852610 A | 1/2013 |
| EP | 1598533 A2 | 11/2005 |

(Continued)

*Primary Examiner* — Audrey K Bradley
(74) *Attorney, Agent, or Firm* — Norton Rose Fulbright US LLP

(57) ABSTRACT

An engine is provided with an exhaust gas treatment device which treats exhaust gas. The exhaust gas treatment device is provided with electric parts which detect a state of the exhaust gas purification device. The engine is provided with a cooling water circulation mechanism which circulates cooling water for the engine. Further, the electric parts are arranged in an outer side of the exhaust gas purification device on an extension in a longitudinal direction of the exhaust gas purification device.

3 Claims, 17 Drawing Sheets

(51) Int. Cl.
  *F01N 3/10* (2006.01)
  *F01N 13/18* (2010.01)
  *F01N 13/00* (2010.01)
  *F01N 3/035* (2006.01)
  *F01P 5/02* (2006.01)
  *F02F 1/24* (2006.01)

(52) U.S. Cl.
  CPC ...... *F01N 2340/04* (2013.01); *F01N 2560/06* (2013.01); *F01N 2560/08* (2013.01); *F01N 2570/10* (2013.01); *F01N 2570/12* (2013.01); *F01N 2590/08* (2013.01); *F01N 2900/1602* (2013.01); *F02D 2200/0802* (2013.01); *F02D 2200/0812* (2013.01); *F02D 2400/22* (2013.01); *Y02T 10/20* (2013.01); *Y02T 10/47* (2013.01)

(56) References Cited

FOREIGN PATENT DOCUMENTS

| | | |
|---|---|---|
| JP | 2000-145430 A | 5/2000 |
| JP | 2005-120839 A | 5/2005 |
| JP | 2007-085292 A | 4/2007 |
| JP | 2007-182705 A | 7/2007 |
| JP | 2009-052494 A | 3/2009 |
| JP | 2010-043572 A | 2/2010 |
| JP | 2010-185292 A | 8/2010 |
| JP | 2011-033394 A | 2/2011 |
| JP | 2012-071743 A | 4/2012 |
| JP | 2014-025402 A | 2/2014 |

* cited by examiner

ENGINE DEVICE

CROSS-REFERENCE TO RELATED APPLICATIONS

The present application is a continuation application of International Application No. PCT/JP2015/56378, filed Mar. 4, 2015, which claims priority to Japanese Patent Application No. 2014-56917, filed Mar. 19, 2014. The contents of these applications are incorporated herein by reference in their entirety.

BACKGROUND OF THE INVENTION

The present invention relates to an engine device.

Conventionally, there has been developed a technique that an exhaust gas purification device (a diesel particulate filter) is provided in an exhaust channel of an engine and exhaust gas discharged out of the diesel engine is purification treated by an oxidation catalyst or a soot filter in the exhaust gas purification device (for example, refer to Japanese Unexamined Patent Publication No. 2000-145430). Further, in recent years, in a field of a working machine such as a construction machine, an agricultural machine, and the like, it has been required that the exhaust gas purification device is provided in the diesel engine which is used in the machine, for the purpose of an environmental countermeasure (for example, refer to Japanese Unexamined Patent Publication No. 2007-182705).

In order to make the oxidation catalyst provided in the exhaust gas purification device carry out an appropriate oxidation treatment, a temperature of the exhaust gas in the exhaust gas purification device is measured for regulating the exhaust gas at a predetermined temperature. Further, since clogging is generated in the soot filter due to sedimentation of the collected particulate matters, the clogging is sensed on the basis of a pressure of the exhaust gas and the deposited particulate matters are forcibly burnt in the exhaust gas purification device. As a result, electric parts such as a temperature sensor and a pressure sensor respectively measuring the temperature of the exhaust gas and the pressure of the exhaust gas are attached to the exhaust gas purification device.

SUMMARY OF THE INVENTION

In the meantime, in the case that the exhaust gas purification device is simply arranged in place of a muffler in the exhaust channel of the engine when the exhaust gas purification device is provided, the exhaust gas purification device is significantly heavier than the muffler. As a result, even if a support structure for the muffler in the construction machine disclosed in Japanese Unexamined Patent Publication No. 2007-182705 is diverted to a support structure for the exhaust gas purification device, there is a problem that the exhaust gas purification device can not be stably assembled.

Further, since the exhaust gas having a high temperature flows along an inner side of the exhaust gas purification device, an exhaust gas purification case comes to a high-temperature heat source. Therefore, the electric parts such as the pressure sensor and the temperature sensor provided in the exhaust gas purification device are affected by radiant heat from the exhaust gas purification device when they are installed in the vicinity of the exhaust gas purification case as disclosed in Japanese Unexamined Patent Publication No. 2010-043572. As a result, there is a risk that the electric parts attached to the exhaust gas purification device break down due to the heat from the exhaust gas purification device and the engine. Particularly, in the case that the breakdown of the temperature sensor and the pressure sensor is generated, a state of the exhaust gas purification device can not be checked out. As a result, a defect such as occurrence of engine stall is generated without dissolving the clogging in the device.

Accordingly, an object of the present invention is to provide an engine device to which an improvement is applied by making a study of these actual conditions.

The invention according to a first aspect of the present invention is an engine device includes an engine, an exhaust gas purification device for purifying exhaust gas from the engine, and electric parts which detect a state of the exhaust gas purification device. The electric parts are arranged in an outer side of the exhaust gas purification device on an extension in a longitudinal direction of the exhaust gas purification device.

The invention according to a second aspect of the present invention is the engine device according to the first aspect, wherein the exhaust gas purification device may be connected to an exhaust manifold provided in one side surface of the engine via an exhaust gas introduction portion, and the electric parts may be arranged at a position which is outside the other side surface of the engine, closer to an outer side than one end surface of an exhaust gas purification case constructing the exhaust gas purification device.

The invention according to a third aspect of the present invention is the engine device according to the second aspect, wherein a part of the electric parts may be a wiring connector which is electrically connected to a temperature sensor attached to the exhaust gas purification device, and an intermediate portion of a wiring connecting the temperature sensor and the wiring connector may be fixed to a flange in the exhaust gas purification case.

The invention according to a fourth aspect of the present invention is the engine device according to any one of the first to third aspects, wherein a cooling fan may be provided in one side surface intersecting an output shaft in the engine, and the exhaust gas purification device may be supported to a cylinder head at a position closer to the cooling fan in an upper surface side of the engine.

According to the embodiment of the present invention, in the engine device having the engine, the exhaust gas purification device for purifying the exhaust gas from the engine, and the electric parts which detect the state of the exhaust gas purification device, the electric parts are arranged in the outer side of the exhaust gas purification device on the extension in the longitudinal direction of the exhaust gas purification device. As a result, it is possible to reduce influence by heat from the exhaust gas purification device and the engine, and it is possible to inhibit the electric parts from breaking down due to the heating. Further, since it is possible to reduce influence not only by conductive heat but also radiant heat applied to the electric parts from the case of the exhaust gas purification device, by arranging the electric parts at the position which is away from the exhaust gas purification device, it is possible to inhibit the electric parts from breaking down due to the heating.

According to the embodiment of the present invention, the exhaust gas purification device is connected to the exhaust manifold provided in one side surface of the engine via the exhaust gas introduction portion, and the electric parts are arranged at the position which is outside the other side surface of the engine, closer to the outer side than one end surface of the exhaust gas purification case constructing the exhaust gas purification device. As a result, the electric parts can be arranged at the position which is away in a downstream side from the exhaust gas purification device. Therefore, it is possible to reduce the influence applied to the electric parts by the conductive heat and the radiant heat from the exhaust gas purification device, and it is possible to inhibit the electric parts from breaking down due to the heating.

According to the embodiment of the present invention, a part of the electric parts is the wiring connector which is electrically connected to the temperature sensor attached to the exhaust gas purification device, and the intermediate portion of the wiring connecting the temperature sensor and the wiring connector is fixed to the flange in the exhaust gas purification case. As a result, the wiring of the temperature sensor can be arranged away from the exhaust gas purification case. It is possible to prevent the wiring of the temperature sensor from being heated by the exhaust gas purification case which forms a heating body, and it is possible to prevent an erroneous detection in the temperature measurement.

According to the embodiment of the present invention, the cooling fan is provided in one side surface intersecting the output shaft in the engine, and the exhaust gas purification device is supported to the cylinder head at the position closer to the cooling fan in the upper surface side of the engine. As a result, the exhaust gas purification device can be supported with a high rigidity by using the cylinder head which is a part having a high rigidity in the engine, while the exhaust gas purification device can be shipped after being assembled in the engine, so that it is possible to prevent the exhaust gas purification device from being damaged by vibration and the like. The cylinder head and upper surface sides of, for example, an intake manifold and an exhaust manifold can be exposed in a wide range, and a maintenance work relevant to the engine is easily carried out.

DESCRIPTION OF THE EMBODIMENTS

Figure 1:
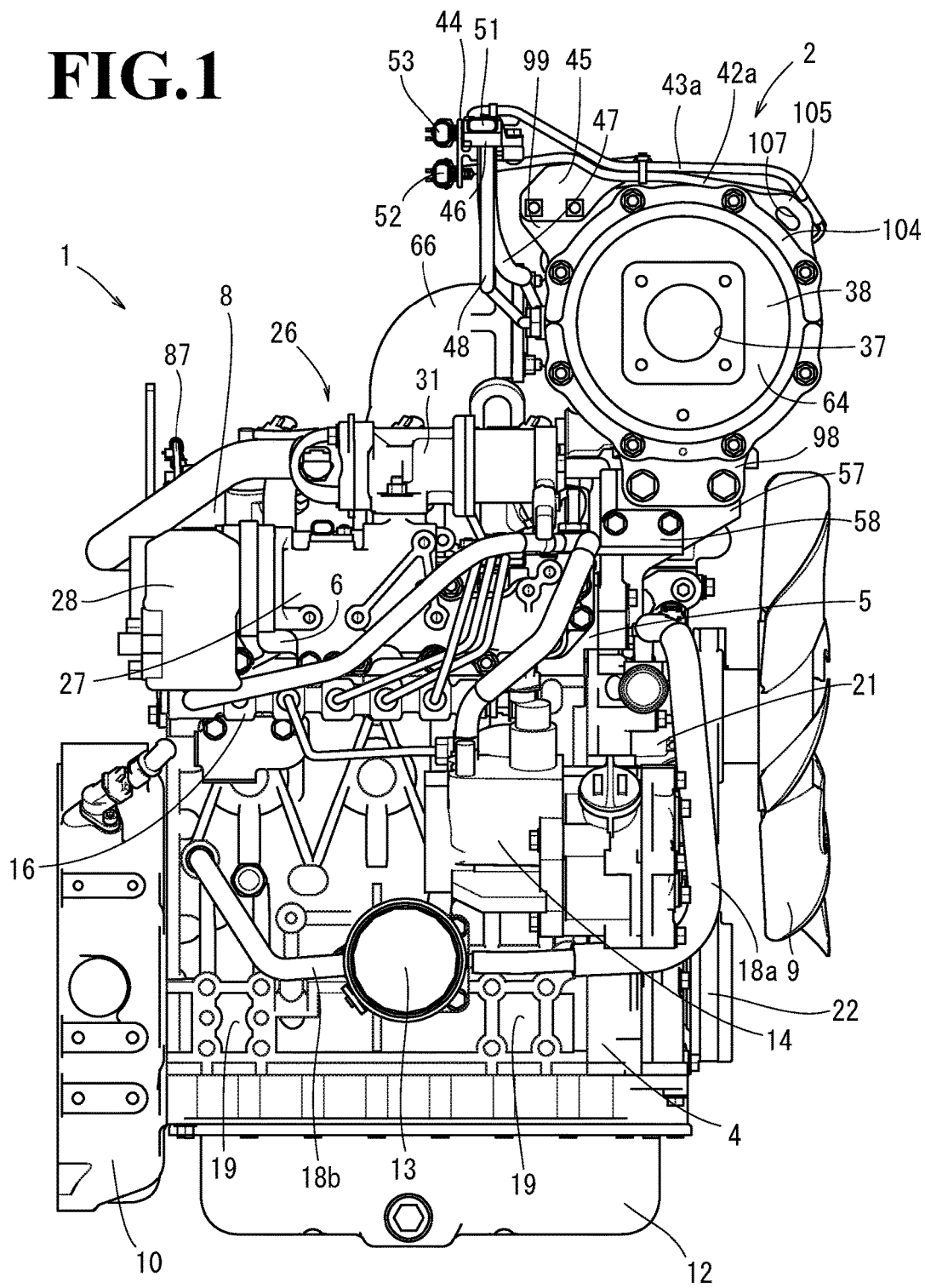
FIG. 1 is a right side elevational view of a diesel engine according to the present invention.
Figure 2:
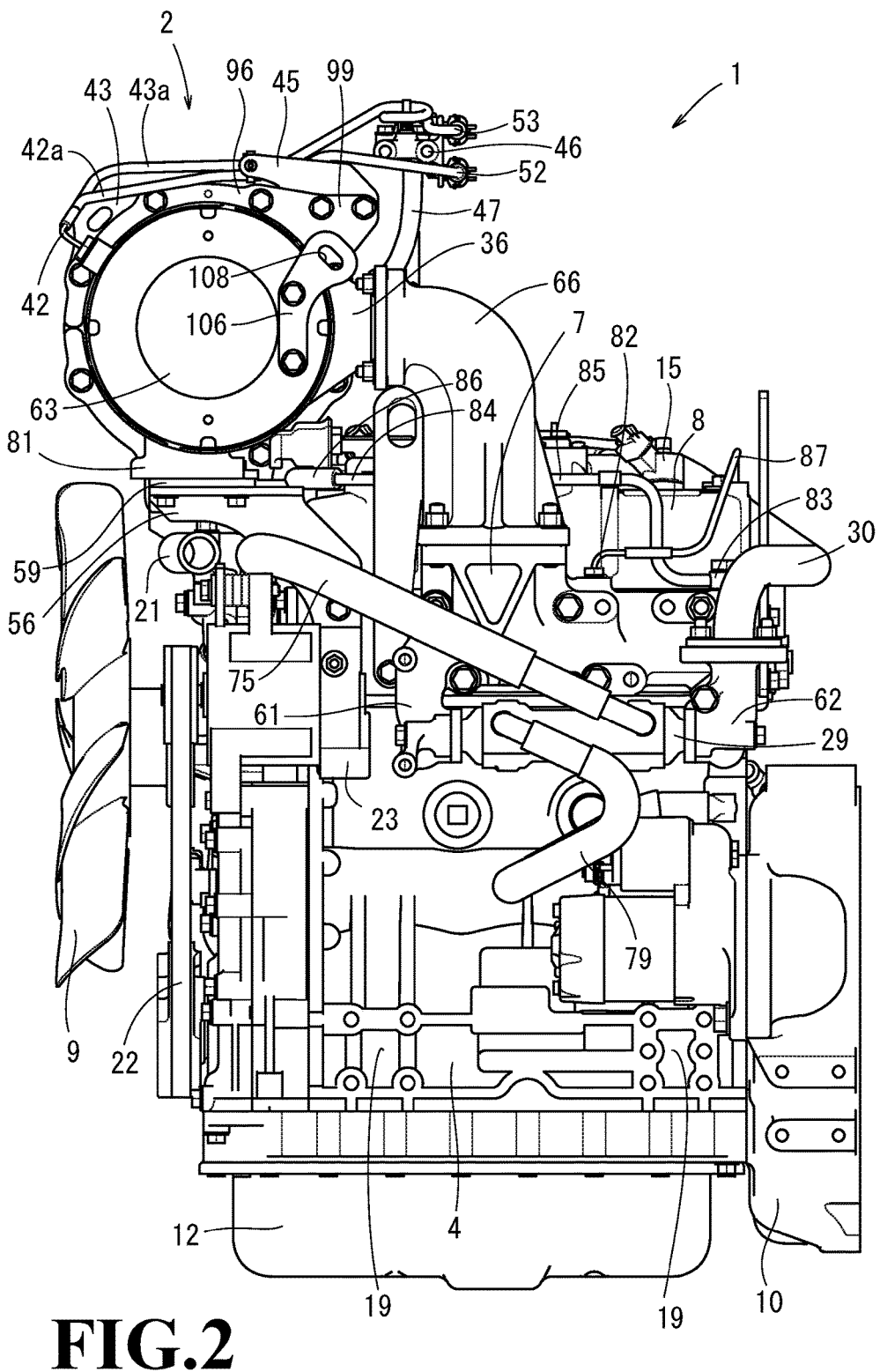
FIG. 2 is a left side elevational view of the engine.
Figure 3:
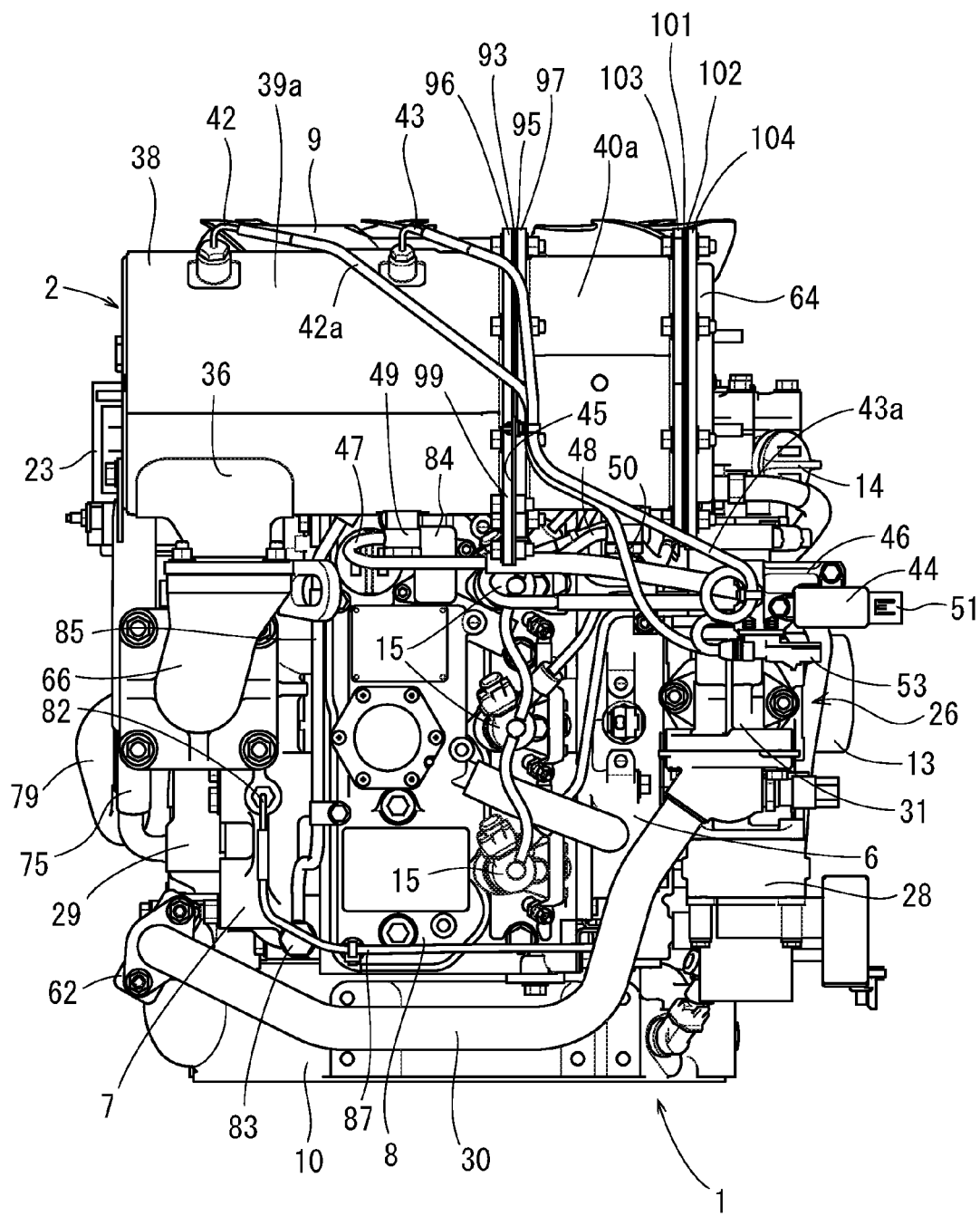
FIG. 3 is a plan view of the engine.

A description will be given below of an embodiment of an engine device according to the present invention and a working machine having the engine device with reference to FIGS. 1 to 17. In the following description, a working vehicle is exemplified as the working machine according to the present embodiment, and details of its structure will be described. Further, in the following description, both side portions along an output shaft (a crank shaft) 3 (both side portions across the output shaft 3) are called as right and left sides, a side where a cooling fan 9 is arranged is called as a front side, a side where a flywheel 11 is arranged is called as a rear side, a side where an exhaust manifold 7 is arranged is called as a left side, and a side where an intake manifold 6 is arranged is called as a right side, and they are assumed to be references for positional relationship in four directions, and upward and downward directions in a diesel engine 1, for convenience.

First of all, a description will be given below of an engine device according to the present invention by exemplifying a diesel engine 1 which is mounted as a prime mover to a working machine such as a working vehicle mentioned later, with reference to FIGS. 1 to 14. As mentioned above, the diesel engine 1 is provided with an exhaust gas purification device 2 which is connected to an exhaust manifold 7. The exhaust gas purification device 2 is provided with an action of reducing carbon monoxide (CO) and carbon hydride (HC) in exhaust gas of the diesel engine 1 in addition to removing particulate matter (PM) in the exhaust gas of the diesel engine 1.

The diesel engine 1 is provided with a cylinder block 4 which has a crank shaft 3 for an engine output and a piston (not shown) built-in. A cylinder head 5 is mounted on the cylinder block 4. An intake manifold 6 is arranged in a right side surface of the cylinder head 5. An exhaust manifold 7 is arranged in a left side surface of the cylinder head 5. A head cover 8 is arranged in an upper side surface of the cylinder head 5. A cooling fan 9 is provided in a front side surface of the cylinder block 4. A flywheel housing 10 is provided in a rear side surface of the cylinder block 4. A flywheel 11 is arranged within the flywheel housing 10. The flywheel 11 is axially supported to the crank shaft 3 (the engine output shaft). The power of the diesel engine 1 is adapted to be taken out to an actuation portion of the working vehicle (a backhoe, a forklift, or the like) via the crank shaft 3.

Further, a sump 12 is arranged in a lower surface of the cylinder block 4. A lubricating oil is stored in the sump 12. The lubricating oil in the sump 12 is sucked by an oil pump (not shown) which is arranged at a position closer to a right side surface within the cylinder block 4, and is supplied to each of lubrication portions of the diesel engine 1 via an oil cooler 18 and an oil filter 13 which are arranged in a right side surface of the cylinder block 4. The lubricating oil supplied to each of the lubrication portions is thereafter returned to the sump 12. The oil pump (not shown) is adapted to be driven by rotation of the crank shaft 3. The oil cooler 18 is provided for cooling the lubricating oil by a cooling water.

The oil cooler 18 is attached above the sump 12 in the right side surface of the cylinder block 4. The oil cooler 18 has a structure in which cooling water pipings 18a and 18b are connected thereto and the cooling water circulates in an inner portion thereof. The oil filter 13 is installed so as to lap over a right side of the oil cooler 18. More specifically, the oil filter 13 and the oil cooler 18 coupled to each other in their right and left sides are installed so as to protrude to an outer side (a right side) from the right side surface of the cylinder block 4 at a position which is above the sump 12.

A fuel supply pump 14 for supplying the fuel is attached to the above of the oil filter 13 (the below of the intake manifold 6) in the right side surface of the cylinder block 4. The diesel engine 1 is provided with respective injectors 15 for three cylinders each of which has an electromagnetic opening and closing control type fuel injection valve (not shown). A fuel tank (not shown) mounted to the working vehicle is connected to each of the injectors 15 via the fuel supply pump 14, a cylindrical common rail 16, and a fuel filter (not shown).

The fuel in the fuel tank is pressure fed to the common rail 16 from the fuel supply pump 14 via the fuel filter (not shown), and the high-pressure fuel is stored in the common rail 16. The high-pressure fuel within the common rail 16 is injected to each of the cylinders of the diesel engine 1 from each of the injectors 15 by controlling to open and close each of fuel injection valves in the injectors 15.

A cooling water pump 21 for circulating the cooling water is arranged in a front surface of the cylinder block 4 coaxially with a fan axis of the cooling fan 9. The cooling water pump 21 is driven together with the cooling fan 9 via a V-belt 22 for driving the cooling fan, on the basis of the rotation of the crank shaft 3. The cooling water within a radiator 24 mounted to the working vehicle is supplied to the cooling water pump 21 by driving the cooling water pump 21. Further, the cooling water is supplied to the cylinder block 4 and the cylinder head 5, and cools the diesel engine 1. An alternator 23 is provided in a left side of the cooling water pump 21.

Engine leg attachment portions 19 are respectively provided in right and left side surfaces of the cylinder block 4. An engine leg body (not shown) is fastened by bolts to each of the engine leg attachment portions 19, the engine leg bodies being coupled to right and left side walls of a machine body frame (an engine support chassis) 94 as well as having a vibration isolation rubber. The diesel engine 1 is supported in a vibration isolation manner to the engine support chassis 94 of a travel machine body in the working vehicle via each of the engine leg bodies (not shown). As a result, it is possible to inhibit the vibration in the diesel engine 1 from being transmitted to the machine body frame 94.

The radiator 24 having a fan shroud 25 attached to a back surface side thereof is provided in a rising manner in a pair of right and left machine body frames 94 so as to be positioned in the front surface side of the engine 1. The fan shroud 25 surrounds an outer side (an outer peripheral side) of the cooling fan 9, and communicates the radiator 24 with the cooling fan 9. On the basis of the rotation of the cooling fan 9, the cooling air blows to the radiator 24 and thereafter flows toward the engine 1 from the radiator 24 via the fan shroud 25.

An air cleaner (not shown) is coupled to an inlet portion of the intake manifold 6 via an EGR device 26 (an exhaust gas recirculation device). The EGR device 26 is mainly arranged in the right side of the engine 1, specifically in a right side direction of the cylinder head 5. Fresh air (external air) is fed to the intake manifold 6 from the air cleaner via the EGR device 26. The EGR device 26 is provided with an EGR main body case 27 (a collector) which mixes a part of the exhaust gas in the diesel engine 1 (the EGR gas from the exhaust manifold) and the fresh air (the external air from the air cleaner 32) so as to supply to the intake manifold 6, an intake air throttle member 28 which communicates the EGR main body case 27 with the air cleaner via an intake pipe (not shown), a recirculated exhaust gas pipe 30 which is connected to the exhaust manifold 7 via an EGR cooler 29 and serves as a reflow conduit, and an EGR valve member 31 which communicates the EGR main body case 27 with the recirculated exhaust gas pipe 30.

More specifically, the intake manifold 6 and the intake air throttle member 28 for introducing the fresh air are connected via the EGR main body case 27. Further, an outlet side of the recirculated exhaust gas pipe 30 extending from the exhaust manifold 7 is communicated with the EGR main body case 27. The EGR main body case 27 is formed into a long tubular shape. The intake air throttle member 28 is fastened by bolts to one end portion in a longitudinal direction of the EGR main body case 27. A downward opening end portion of the EGR main body case 27 is detachably fastened by bolts to an inlet portion of the intake manifold 6.

Further, an outlet side of the recirculated exhaust gas pipe 30 is coupled to the EGR main body case 27 via the EGR valve member 31. An inlet side of the recirculated exhaust gas pipe 30 is coupled to a lower surface side of the exhaust manifold 7 via the EGR cooler 29. The recirculated exhaust gas pipe 30 is arranged above the flywheel housing 10 so as to bypass a rear surface of the cylinder head 5. Further, a supply amount of the EGR gas to the EGR main body case 27 is regulated by regulating an opening degree of an EGR valve (not shown) within the EGR valve member 31.

According to the above structure, the fresh air (the external air) is supplied into the EGR main body case 27 from the air cleaner (not shown) via the intake air throttle member 28, and the EGR gas (a part of the exhaust gas discharged out of the exhaust manifold) is supplied into the EGR main body case 27 from the exhaust manifold 7 via the EGR valve member 31. The fresh air from the air cleaner and the EGR gas from the exhaust manifold 7 are mixed within the EGR main body case 27, and the mixed gas within the EGR main body case 27 is thereafter supplied to the intake manifold 6. More specifically, a part of the exhaust gas discharged out of the diesel engine 1 to the exhaust manifold 7 is reflowed to the diesel engine 1 from the intake manifold 6. As a result, the highest combustion temperature at the high-load operation time is lowered, and a discharge amount of NOx (nitrogen oxides) from the diesel engine 1 can be lowered.

When the EGR cooler 29 is arranged as mentioned above, an EGR gas takeout pipe 61 is integrally formed in the exhaust manifold 7. Further, a pipe joint member 62 is fastened by bolts to the exhaust manifold 7. The EGR cooler 29 is arranged away from the cylinder block 4 (specifically the left side surface) by supporting an EGR gas outlet portion of the EGR cooler 29 by the pipe joint member 62 connecting the recirculated exhaust gas pipe 30 as well as supporting the EGR gas inlet portion of the EGR cooler 29 by the EGR gas takeout pipe 61.

As mentioned above, the EGR cooler 29 for cooling the EGR gas is arranged below the exhaust manifold 7 in the left side surface of the cylinder block 4. Therefore, the exhaust manifold 7 and the EGR cooler 29 can be compactly installed along one side surface of the engine 1. Further, a cooling water piping channel connecting the cooling water pump 21 to the EGR cooler 29 is provided in the left side (the exhaust manifold 7 side) of the diesel engine 1. As a result, the cooling water from the cooling water pump 21 is adapted to not only be supplied to the water cooling portion of the diesel engine 1 but also be partly fed to the EGR cooler 29.

Further, an exhaust gas outlet of the exhaust manifold 7 is open upward in the left side of the cylinder head 5. The exhaust gas outlet of the exhaust manifold 7 is detachably coupled to an elbow-like relay pipe 66. The relay pipe 66 is mounted onto the exhaust gas outlet of the exhaust manifold 7, and the relay pipe 66 is fastened to an exhaust gas outlet body of the exhaust manifold 7 by four bolts. A lower surface side opening portion of the relay pipe 66 is firmly fixed to the exhaust gas outlet body of the exhaust manifold 7. A laterally facing opening portion of the relay pipe 66 is coupled to a purification inlet pipe 36 of the exhaust gas purification device 2.

Therefore, the exhaust manifold 7 is connected to the exhaust gas purification device 2 mentioned above via the relay pipe 66. The exhaust gas moving into the exhaust gas purification device 2 from the outlet portion of the exhaust manifold 7 via the relay pipe 66 is purified by the exhaust gas purification device 2, moves to a tail pipe (not shown) from a purification outlet (an exhaust gas discharge portion) 37, and is finally discharged out of the machine. The relay pipe 66 couples the exhaust gas inlet to the exhaust gas outlet of the exhaust manifold 7 and is supported by the exhaust manifold 7. Therefore, the relay pipe 66 is supported by the exhaust manifold 7 having a high rigidity, and a support structure with the exhaust gas purification device 2 via the relay pipe 66 can be constructed with a high rigidity.

A description will be given of the cooling water piping channel which is provided in the left side (the exhaust manifold 7 side) of the diesel engine 1. A cooling water discharge port of the EGR cooler 29 is connected to one end of a cooling water return hose (a cooling water pump suction side piping) 75 which is connected in its other end to the cooling water pump 21. Further, a cooling water intake port of the EGR cooler 29 is connected to the cylinder block 4 via a cooling water takeout hose (an EGR cooler suction side piping) 79. The cooling water from the cooling water pump 21 is partly supplied to the cylinder block 4 and circulated.

As mentioned above, the oil cooler 18 is arranged in the intake manifold 6 side and the EGR cooler 29 mentioned later is arranged in the exhaust manifold 7 side across the crank shaft 3, respectively. As a result, since a cooling water circulation system for the EGR cooler 29 and a cooling water circulation system for the oil cooler 18 are distributed into both right and left sides across the crank shaft 3 in a plan view, the layouts of the respective cooling water circulation systems are easily understood, and it is possible to improve an assembling workability and a maintenance property.

The exhaust manifold 7 is provided with a structure in which the exhaust gas pressure sensor pipe 85 is connected to a pressure takeout port 83. More specifically, the pressure takeout port 83 provided in a rear end of an upper surface of the exhaust manifold 7 is connected to one end of the exhaust gas pressure sensor pipe 85 which is extended in a front-back direction along the left side surface of the head cover 8. Further, an exhaust gas pressure sensor 84 is installed to a front end side (the cooling water pump 21 side) of the head cover 8, and the exhaust gas pressure sensor 84 is connected to the other end of the exhaust gas pressure sensor pipe 85 via an exhaust gas pressure hose 86 (a connection part) constructed by a flexible rubber hose.

The pressure takeout port 83 is arranged at a position between the cylinder head 5 and the pipe joint member 62 on the upper surface of the exhaust manifold 7. Further, a gas temperature sensor 82 measuring an exhaust gas temperature within the exhaust manifold 7 is additionally provided in an outer side (the pipe joint member 62 side) of the pressure takeout port 83, on the upper surface of the exhaust manifold 7. An electric wiring 87 of the gas temperature sensor 82 is passed through an upper portion of a rear end (the flywheel 11 side) of the head cover 8, and is connected to a connector (not shown) in a right side surface.

The radiator 24 is arranged at a position facing to the cooling fan 9 via the fan shroud 25 in a forward side of the diesel engine 1. As mentioned above, the radiator 24 is arranged in a line toward a cooling air discharging direction at a position facing to the cooling fan 9 in the forward side of the diesel engine 1. Therefore, the outside air (the cooling air) is blown to the radiator 24 serving as a heat exchanger by sucking the outside air from the rear side of the diesel engine 1 on the basis of the rotational drive of the cooling fan 9, and is cooled by air.

Further, since the outer peripheral side of the cooling fan 9 is surrounded by the fan shroud 25, it is possible to inhibit the cooling air from the cooling fan 9 from being directly blown to the exhaust gas purification device 2. As a result, it is possible to appropriately maintain an exhaust gas purification performance of the exhaust gas purification device 2 by avoiding the reduction of the exhaust gas temperature in the exhaust gas purification device 2 by the cooling air from the cooling fan 9 as much as possible. In the light of the positional relationship, the cooling water pump 21 faces to the cooling fan 9, and the cooling air from the cooling fan 9 directly blows to the cooling water pump 21. Therefore, existence of the exhaust gas purification device 2 does not prevent the air cooling of the cooling water pump 21.

Next, a description will be given of the exhaust gas purification device 2 with reference to FIGS. 1 to 10. The exhaust gas purification device 2 is provided with an exhaust gas purification case 38 which has a purification inlet pipe (an exhaust gas introduction portion) 36 and is made of a heat resistant metal material. The exhaust gas purification case 38 is formed into a cylindrical shape which extends long in a lateral direction. Further, a purification inlet pipe 36 is provided in a left side (an upstream side in an exhaust gas moving direction) of the exhaust gas purification case 38. A purification outlet 37 is provided in a right side (a downstream side in the exhaust gas moving direction) of the exhaust gas purification case 38.

A diesel oxidation catalyst 39 (a gas purification body) and a soot filter 40 (a gas purification body) are arranged in series along the moving direction of the exhaust gas, in an inner portion of the exhaust gas purification case 38, the diesel oxidation catalyst 39 creating nitrogen dioxide (NO2) and made of platinum or the like, and the soot filter 40 continuously oxidizing and removing the collected particulate matter (PM) at a comparatively low temperature and having a honeycomb structure. For example, a muffler and a tail pipe is coupled to the purification outlet (the exhaust gas outlet) 37 of the exhaust gas purification case 38 via the exhaust pipe, and the exhaust gas is discharged out of the purification outlet 37 to an external portion via the muffler or the tail pipe.

According to the above structure, the nitrogen dioxide (NO2) created by the oxidation action of the diesel oxidation catalyst 39 is supplied into the soot filter 40 from one side end surface (an intake side end surface). The particulate matters (PM) included in the exhaust gas of the diesel engine 1 are collected by the soot filter 40 and are continuously oxidized and removed by the nitrogen dioxide (NO2). In addition to the removal of the particulate matters (PM) in the exhaust gas of the diesel engine 1, the content of the carbon monoxide (CO) and the carbon hydride (HC) in the exhaust gas of the diesel engine 1 is reduced.

The exhaust gas purification case 38 is provided with a catalyst case 39a and a filter case 40a, and is formed into a double-tube structure. An upstream side lid body 63 is fixed by welding to one end side (an end portion in an exhaust gas upstream side) of the catalyst case 39a. The lid body 63 is formed into a double-tube structure having an inner lid and an outer lid. The purification inlet pipe 36 is fixed by welding to an outer peripheral side of the catalyst case 39a. The purification inlet pipe 36 is communicated with an inner side of the catalyst case 39a via an exhaust gas inlet (not shown) which is formed in the catalyst case 39a.

A thin plate catalyst flange 93 is provided in the other end side (an end portion in an exhaust gas downstream side) of the catalyst case 39a, and a filter inlet flange 95 is provided by welding in one end side (an end portion in an exhaust gas upstream side) of the filter case 40a. The catalyst case 39a and the filter case 40a are coupled by confronting the catalyst flange 93 and the filter inlet flange 95, pinching both the flanges 93 and 95 by thick plate center pinching flanges 96 and 97 surrounding outer peripheral sides of the respective purification cases 39a and 40a from both sides in the exhaust gas moving direction, and fastening both the center pinching flanges 96 and 97 together with both the flanges 93 and 95.

The center pinching flanges 96 and 97 are constructed by circular arc bodies which are divided into a plurality of sections in a peripheral direction of the corresponding purification cases 39a and 40a. Each of the circular arc bodies constructing the center pinching flanges 96 and 97 is formed into a circular arc shape (an approximately semicircular horseshoe) obtained by confronting end portions to each other in the peripheral direction so as to surround the outer peripheral sides of the purification cases 39a and 40a. Here, the confronting portion between the end portions of the circular arc bodies of the center pinching flange (the catalyst side flange) 96, and the confronting portion between the end portions of the circular arc bodies of the center pinching flange (the filter inlet side flange) 97 are put at positions which are deviated from each other in their phases (the confronting portions are not lapped over each other with the same phase).

The other end side (the end portion in the exhaust gas downstream side) of the filter case 40a is closed by the downstream side lid body 64 which is formed into the double structure by the inner lid and the outer lid. The purification outlet (the exhaust gas outlet) 37 is open to an approximately center portion of the downstream side lid body 64. A thin plate filter outlet flange 101 is provided in the other end side of the filter case 40a, and is confronted to a lid body flange 102 in an outer peripheral side of the downstream side lid body 64. Further, the filter case 40a and the downstream side lid body 64 are coupled by pinching the filter outlet flange 101 and the lid body flange 102 by thick plate outlet pinching flanges 103 and 104 surrounding the outer peripheral side of each of the purification case 40a and the lid body 64 from both side in the exhaust gas moving direction, and fastening both the outlet pinching flanges 103 and 104 together with both the flanges 101 and 102.

The outlet pinching flanges 103 and 104 are constructed by circular arc bodies which are divided into a plurality of sections in the peripheral directions of the corresponding purification cases 39a and 40a, in the same manner as the center pinching flanges 96 and 97. The circular arc bodies constructing the outlet pinching flanges 103 and 104 basically have the same shape as the circular arc bodies constructing the center pinching flanges 96 and 97. The confronting portion between the end portions of the circular arc bodies of the outlet pinching flange (the filter outlet side flange) 103, and the confronting portion between the end portions of the circular arc bodies of the outlet pinching flange (the lid body flange) 104 are put at positions which are deviated from each other in their phases.

Further, thermistor shaped upstream side gas temperature sensor 42 and downstream side gas temperature sensor 43 are additionally provided in the exhaust gas purification case 38. The exhaust gas temperature in the gas inflow side end surface of the diesel oxidation catalyst 39 is detected by the upstream side gas temperature sensor 42. The exhaust gas temperature in the gas outflow side end surface of the diesel oxidation catalyst is detected by the downstream side gas temperature sensor 43.

Further, a differential pressure sensor (an exhaust gas pressure sensor) 44 serving as an exhaust gas pressure sensor is additionally provided in the exhaust gas purification device 2. The differential pressure sensor 44 detects a pressure difference of the exhaust gas between the upstream side and the downstream side of the soot filter 40. The differential pressure sensor 44 integrally provided with an electric wiring connector 51 is supported to a sensor bracket (a sensor support body) 46 mentioned later together with electric wiring connectors 52 and 53 of the gas temperature sensors 42 and 43. A sedimentation amount of the particulate matters in the soot filter 40 is computed on the basis of the exhaust gas pressure difference between the upstream side and the downstream side of the soot filter 40, and a clogging state within the soot filter 40 can be comprehended.

An upstream side sensor piping 47 and a downstream side sensor piping 48 are respectively connected in their one end sides to the differential pressure sensor 44. Respective sensor piping boss bodies 49 and 50 in an upstream side and a downstream side are arranged in the exhaust gas purification case 38 in such a manner as to pinch the soot filter 40 within the exhaust gas purification case 38. The upstream side sensor piping 47 and the downstream side sensor piping 48 are connected respectively in their other end sides to the sensor piping boss bodies 49 and 50. Further, each of the sensor piping boss bodies 49 and 50 is installed in an opposite side to the cooling fan 9 in the outer peripheral surface of the exhaust gas purification case 38.

According to the structure mentioned above, the difference (the differential pressure of the exhaust gas) between the exhaust gas pressure in the inflow side of the soot filter 40 and the exhaust gas pressure in the outflow side of the soot filter 40 is detected via the differential pressure sensor 44. Since a residual volume of the particulate matters in the exhaust gas collected by the soot filter 40 is in proportion to the differential pressure in the exhaust gas, a regeneration control (for example, a control of raising the exhaust temperature) is executed for reducing an amount of the particulate matters in the soot filter 40 on the basis of results of detection of the differential pressure sensor 44 in the case that the amount of the particulate matters remaining in the soot filter 40 is increased to a predetermined amount or more. Further, in the case that the residual volume of the particulate matters is further increased to a regeneration controllable range or more, a maintenance work for artificially removing the particulate matters is carried out by disassembling the exhaust gas purification case 38 in a detachable manner and cleaning the soot filter 40.

In a front view (or a plan view) of the engine 1, the electric parts such as the differential pressure sensor 44 and the connectors 41 to 53 are arranged in the outer side of the exhaust gas purification device 2 on an extension in a longitudinal direction of the exhaust gas purification device 2. The electric parts 44 and 51 to 53 are supported by the sensor bracket 46 so as to be arranged at the positions which are closer to the outer side (the downstream side in the exhaust gas moving direction) than the purification outlet (the exhaust gas discharge portion) 37. In other words, the electric parts such as the differential pressure sensor 44 and the connectors 41 to 53 are arranged in the outer side (the right side) of the downstream side lid body 64 of the exhaust gas purification case 38 by the sensor bracket 46.

Since it is possible to reduce the influence not only of the conductive heat but also of the radiant heat from the exhaust gas purification case 38 to the electric parts, by arranging the electric parts including the differential pressure sensor 44 at the positions which are away from the exhaust gas purification device 2, it is possible to inhibit the electric parts from breaking down. Particularly, since it is possible to reduce the heating applied by the exhaust gas purification device 2 to the detection main body of the differential pressure sensor 44, it is possible to inhibit the differential pressure sensor 44 from erroneously operating or breaking down.

Further, in a side elevational view (or a plan view) of the engine 1, the sensor bracket 46 is arranged so as to be positioned in an opposite side (the head cover 8 side) to the cooling fan 9 in the outer peripheral portion of the exhaust gas purification case 38, thereby supporting the electric parts such as the differential pressure sensor 44 and the connectors 41 to 53. More specifically, the differential pressure sensor 44 and the connectors 51 to 53 in relation to the exhaust gas purification device 2 are supported to the opposite side to the cooling fan 9 in the outer peripheral portion of the exhaust gas purification device 2.

Since the differential pressure sensor 44 is positioned in the opposite side to the cooling fan 9 in the outer peripheral portion of the exhaust gas purification device 2 as mentioned above, it is possible to shorten a connecting channel length to the sensor piping boss bodies 49 and 50 which are provided in the opposite side to the cooling fan 9 in the same manner. Further, the upstream side sensor piping 47 and the downstream side sensor piping 48 connecting the differential pressure sensor 44 and the sensor piping boss bodies 49 and 50 can be arranged in the opposite side to the cooling fan 9 in relation to the exhaust gas purification device 2.

The differential pressure sensor 44 and each of the sensor pipings 47 and 48 are hard to be exposed to the cooling air from the cooling fan 9 by being arranged in the opposite side to the cooling fan 9 in the outer peripheral portion of the exhaust gas purification device 2. As a result, the erroneous detection of the differential pressure sensor 44 can be prevented by avoiding the matter that the exhaust gas within the differential pressure sensor 44 and each of the sensor pipings 47 and 48 is cooled by the cooling air from the cooling fan 9 as much as possible, and it is possible to improve a precision of the regeneration control for reducing the particulate matters of the soot filter 40 (appropriately execute the regeneration control).

A support plate (a wiring fixation portion) 45 is detachably attached to a plate fastening portion (a plate support portion) 99 with through hole provided in one circular arc body (an upper side circular arc body) in the intermediate pinching flange 96. A support body fastening portion 98 fastened to a support member 60 mentioned later is provided in the other circular arc body (a lower side circular arc body) in the intermediate pinching flange 96. A plate fastening portion 99 is arranged at a position which is an opposite side (the head cover 8 side) to the cooling fan 9 across the exhaust gas purification case 38. Therefore, the support plate 45 is arranged in the opposite side to the cooling fan 9 in the outer peripheral portion of the exhaust gas purification device 2 in the same manner as the sensor bracket 46 by being fastened by bolts to the plate fastening portion 99.

Each of the temperature sensors 42 and 43 is installed at a position which is closer to the cooling fan 9 side in an upper side of an outer peripheral surface of the exhaust gas purification case 38, in the exhaust gas purification device 2. Further, the sensor bracket 46 is arranged at a position which is above the right side (the intake manifold 6 side) of the engine 1, and is an opposite side to the cooling fan 9 across the exhaust gas purification device 2. Sensor wirings 42*a* and 43*a* connecting the respective connectors 52 and 53 from the respective temperature sensors 42 and 43 are wired so as to stride over the upper portion of the exhaust gas purification case 38, and are fixed in their intermediate portions by the support plate 45.

More specifically, each of the sensor wirings 42*a* and 43*a* is connected its one end to each of the temperature sensors 42 and 43 in the cooling fan 9 side of the exhaust gas purification case 38, is connected its other end to each of the wiring connectors 52 and 53 which are arranged in the upper portion of the EGR device 26, and is fixed its intermediate portion by the intermediate pinching flange 96 of the exhaust gas purification case 38. Therefore, since each of the sensor wirings 42*a* and 43*a* can be arranged away from the exhaust gas purification case 38, it is possible to prevent the heating by the exhaust gas purification case 38 which serves as a heat generating body, and it is possible to prevent an erroneous detection in the temperature measurement.

Figure 11:
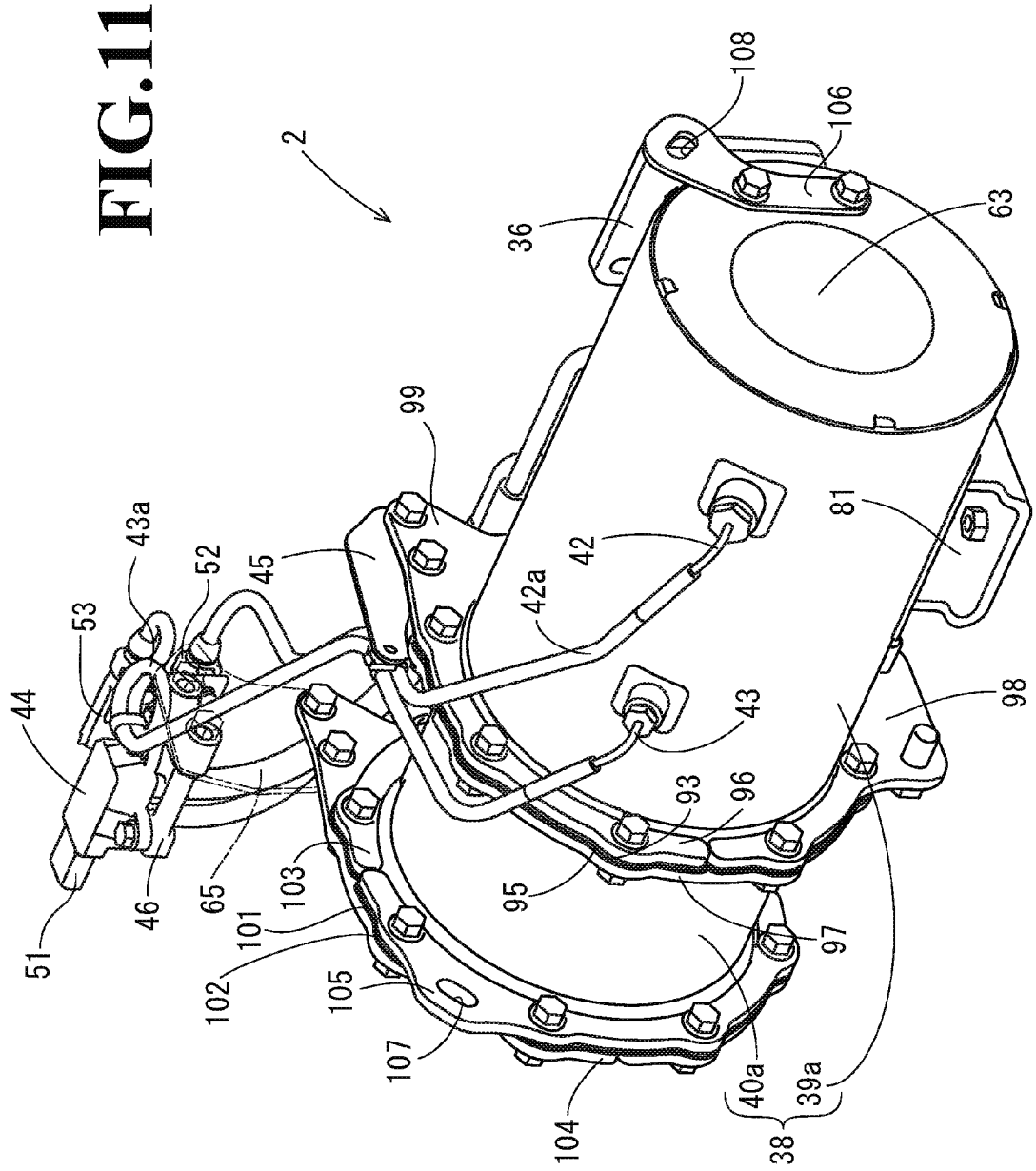
FIG. 11 is a view showing an example of a support structure for electric parts in the exhaust gas purification device.

The sensor bracket 46 may be structured, for example, as shown in FIG. 11, such that its one end is supported by being coupled to a coupling bracket 65 coupled by a downstream side lid body 64 of the exhaust gas purification device 2. More specifically, each of the electric parts 44 and 51 to 53 fixed to the sensor bracket 46 can be fixedly arranged at the position above the EGR device 26 which is a right side in the rear of the exhaust gas purification device 2, by coupling the sensor bracket 46 to the outlet pinching flange 104 via the coupling bracket 65.

Figure 12:
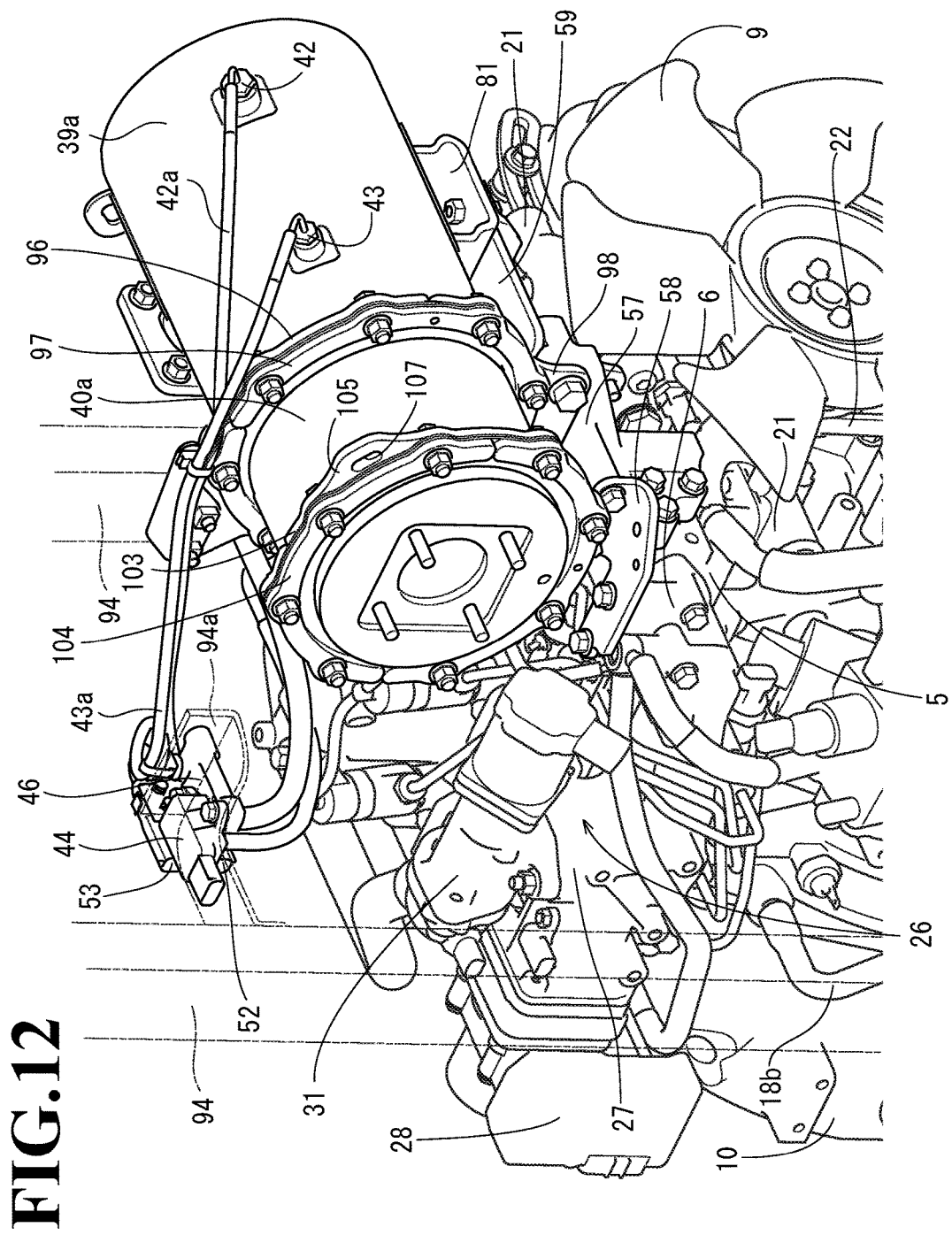
FIG. 12 is a view showing the other example of the support structure for the electric parts in the exhaust gas purification device.
Figure 13:
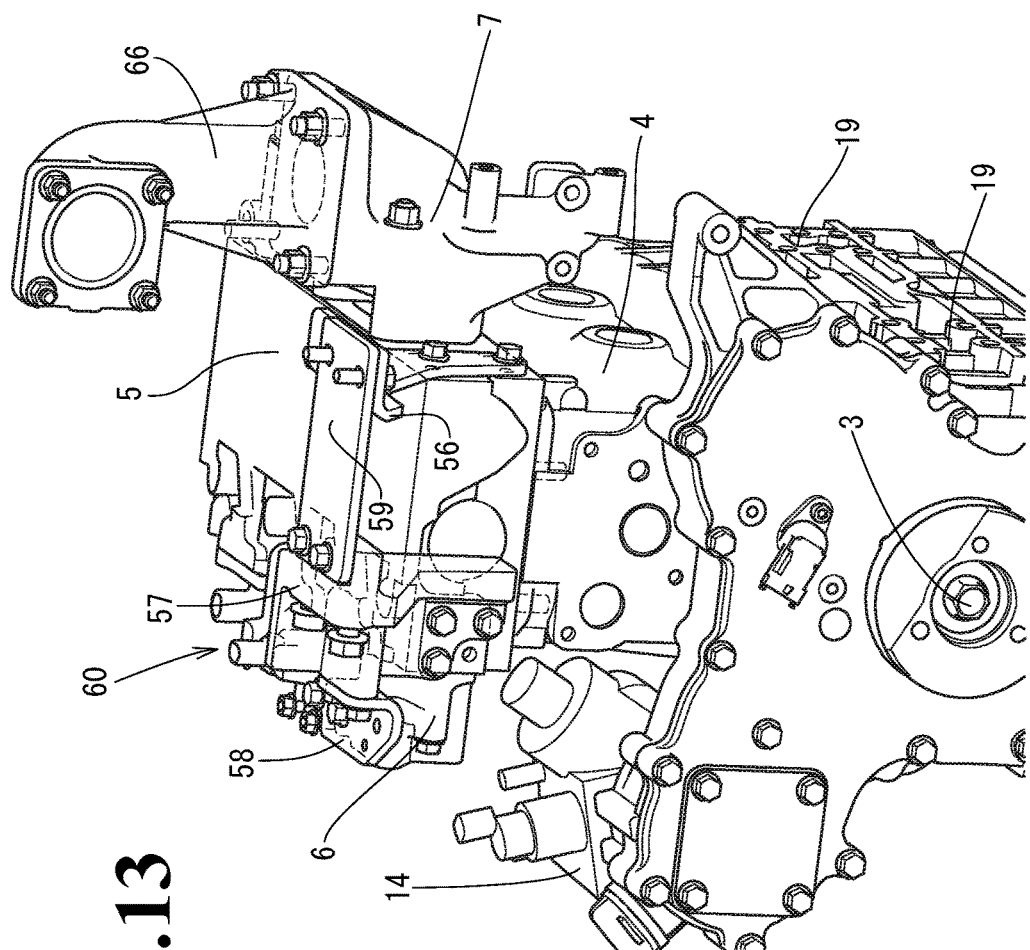
FIG. 13 is a perspective view for describing a structure of an attachment portion for the exhaust gas purification device.
Figure 14:
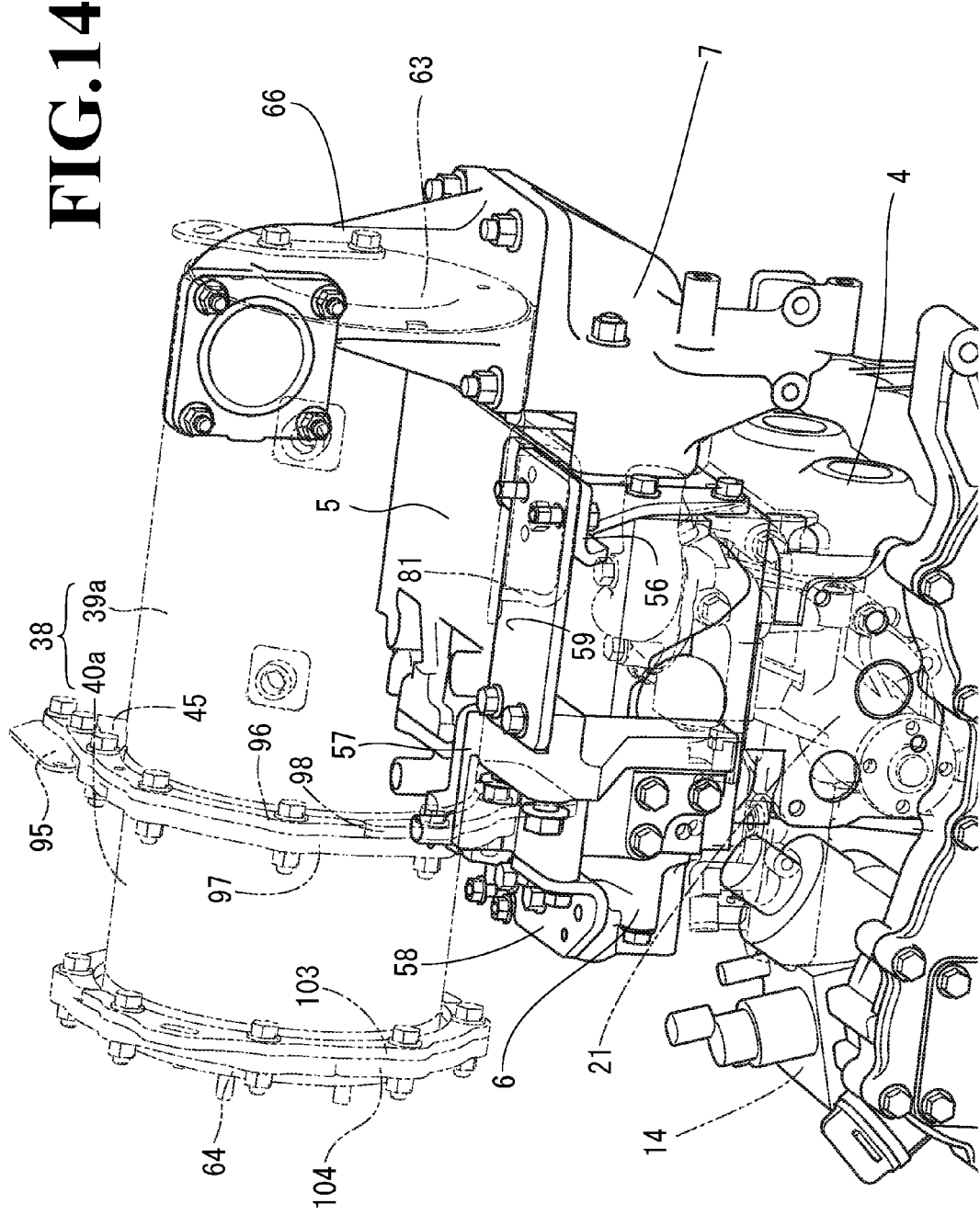
FIG. 14 is an enlarged view for describing the structure of the attachment portion.

Further, the sensor bracket 46 may be adapted to be supported to the machine body frame 94 via a coupling member 94*a*, for example, as shown in FIG. 12. According to the support of the sensor bracket 46 by the machine body frame 94, each of the electric parts 44 and 51 to 53 fixed to the sensor bracket 46 can be fixed to the position above the EGR device 26 which is the right side in the rear of the exhaust gas purification device 2. It is possible to reduce an influence given to the sensor bracket 46 by a vibration difference between the engine 1 and the machine body frame 94, by coupling the sensor bracket 46 through an elastic member when the sensor bracket 46 is fixed to the machine body frame 94 via the coupling member 94*a*, in the engine 1.

As mentioned above, the sensor bracket 46 is arranged at the position which is the opposite side to the cooling fan 9 across the exhaust gas purification device 2 in the outer side of the exhaust gas purification device 2 (the downstream side in the exhaust gas moving direction). Therefore, the differential pressure sensor 44 and the connectors 51 to 53 can be supported at the position which is away from the exhaust gas purification device 2, by the sensor bracket 46. More specifically, the differential pressure sensor 44 and the connectors 51 to 53 are arranged in the right side (the downstream side in the exhaust gas moving direction) in relation to the downstream side end surface (the downstream side lid body) 64 of the exhaust gas purification case 38 and in the rear side (the head cover 8 side) in relation to the outer peripheral surface of the exhaust gas purification case 38 (the outer peripheral surface of the filter case 40*a*). Therefore, since the electric parts such as the differential pressure sensor 44 and the connectors 51 to 53 are arranged away from the exhaust gas purification device 2 by the sensor bracket 46, it is possible to suppress the influence applied to the electric parts by the heat from the exhaust gas purification device 2.

Further, in the embodiment, a suspension body 105 is integrally formed in one of the circular arc bodies in the outlet pinching flange 103 in the filter outlet side, and a suspension fitting 106 is attached to the upstream side lid body 63. The suspension body 105 and the suspension fitting 106 are faced in a spaced manner in both sides in the exhaust gas moving direction, so that respective opening holes 107 and 108 are positioned in a diagonal direction of the exhaust gas purification case 38 (a direction intersecting the longitudinal axis A).

According to the structure mentioned above, the exhaust gas purification device 2 can be assembled in the engine 1 by locking the suspension body 105 and the suspension fitting 106, for example, to a hook (not shown) of a chain block, and moving up and down the exhaust gas purification device 2 (the exhaust gas purification case 38) by the chain block, in an assembling plant or the like. More specifically, the exhaust gas purification case 38 can be smoothly mounted to the engine 1 by using the suspension body 105 and the suspension fitting 106 without lifting up the exhaust gas purification case 38 with the worker's own force.

Further, the exhaust gas purification device 2 as a heavy object can be suspended in a stable attitude according to the positional relationship in the diagonal direction of the suspension body 105 and the suspension fitting 106. For example, it is possible to easily position the exhaust gas purification device 2 in relation to the DPF attachment portion of the engine 1. Therefore, it is possible to improve an assembling workability of the exhaust gas purification device 2. The suspension body 105 may be integrally formed not only in the outlet pinching flange 103 in the filter outlet side but also in the other pinching flanges 96, 97, and 104.

Further, a plurality of bolt fastening portions with through holes are provided at uniform intervals along the peripheral direction in each of the pinching flanges 96, 97, 103, and 104 corresponding to the thick plate flanges. Further, bolt holes corresponding to the respective bolt fastening portions of the pinching flanges 96, 97, 103, and 104 are formed in the flanges 93, 95, 101, and 102. As a result, attachment phases of the group of circular arc bodies in each of the pinching flanges 96, 97, 103, and 104 can be changed in multiple stages around the longitudinal axis in the exhaust gas moving direction of the exhaust gas purification case 38 (along the peripheral direction of the exhaust gas purification case 38).

According to the structure mentioned above, the position of the suspension body 105 can be easily changed in relation to the coupling direction of the purification inlet pipe 36 and the purification outlet 37 (the attachment specification of the exhaust gas purification device 2 to the engine 1) without changing the shape of each of the pinching flanges 96, 97, 103, and 104 (the forming position of the suspension body 105), thereby contributing to a further improvement of the assembling workability of the exhaust gas purification device 2.

Further, the attachment position of the upstream side lid body 63 can be changed around the longitudinal axis in the exhaust gas moving direction of the exhaust gas purification case 38 (along the peripheral direction of the exhaust gas purification case 38). As a result, the differential pressure sensor 44 can be arranged in the upper side of the exhaust gas purification case 38 while setting the fastening position of the sensor bracket 46 to the upper side of the upstream side lid body 63, and the suspension body of the sensor bracket 46 can be arranged at a height position in correspondence to the suspension body 105.

As mentioned above, the exhaust gas purification device 2 is supported to the cylinder head 5 at a position which is closer to the cooling fan 9 in the upper surface side of the engine 1. As a result, the exhaust gas purification device 2 can be supported with a high rigidity by using the cylinder head 5 which is a part having a high rigidity in the engine 1, while the exhaust gas purification device 2 can be shipped after being assembled in the engine 1, so that it is possible to prevent the exhaust gas purification device 2 from being damaged by the vibration and the like. Further, the exhaust gas purification device 2 can be communicated with the exhaust manifold 7 at close range, the exhaust gas purification device 2 can be easily maintained at an appropriate temperature, and a high exhaust gas purification performance can be maintained. As a result, it is possible to contribute to downsizing of the exhaust gas purification device 2. Further, since the exhaust gas purification device 2 is arranged at a position which is close to the cooling fan 9 in the upper surface side of the engine 1, the upper surface side of the cylinder head 5, the intake manifold 6, and the exhaust manifold 7 can be exposed in a wide range, and a maintenance work relevant to the engine 1 can be easily carried out.

In the embodiment, a space between the head cover 8 and the cooling fan 9 in the upper surface side of the engine 1 exists as a dead space. Accordingly, the exhaust gas purification device 2 is positioned between the head cover 8 and the cooling fan 9 in the upper surface side of the engine 1, so that the longitudinal direction of the exhaust gas purification device 2 is orthogonal to the output shaft 3 of the engine 1. As a result, the engine 1 can be adapted to have a total height which is held down as low as possible, even in the engine 1 in which the exhaust gas purification device 2 is assembled, and a compact structure of the engine 1 can be achieved by effectively utilizing the dead space between the head cover 8 and the cooling fan 9.

In the embodiment, since the outer peripheral side of the cooling fan 9 is surrounded by the fan shroud 20, it is possible to inhibit the cooling air from the cooling fan 9 from directly blowing to the exhaust gas purification device 2. As a result, the exhaust gas purification performance of the exhaust gas purification device 2 can be appropriately maintained by avoiding the reduction of the exhaust gas temperature in the exhaust gas purification device 2 by the cooling air from the cooling fan 9 as much as possible. In the light of the positional relationship, the cooling water pump 21 faces to the cooling fan 9, and the cooling air from the cooling fan 9 directly blows to the cooling water pump 21. Therefore, the existence of the exhaust gas purification device 2 does not prevent the cooling water pump 21 from being cooled with air.

Figure 4:
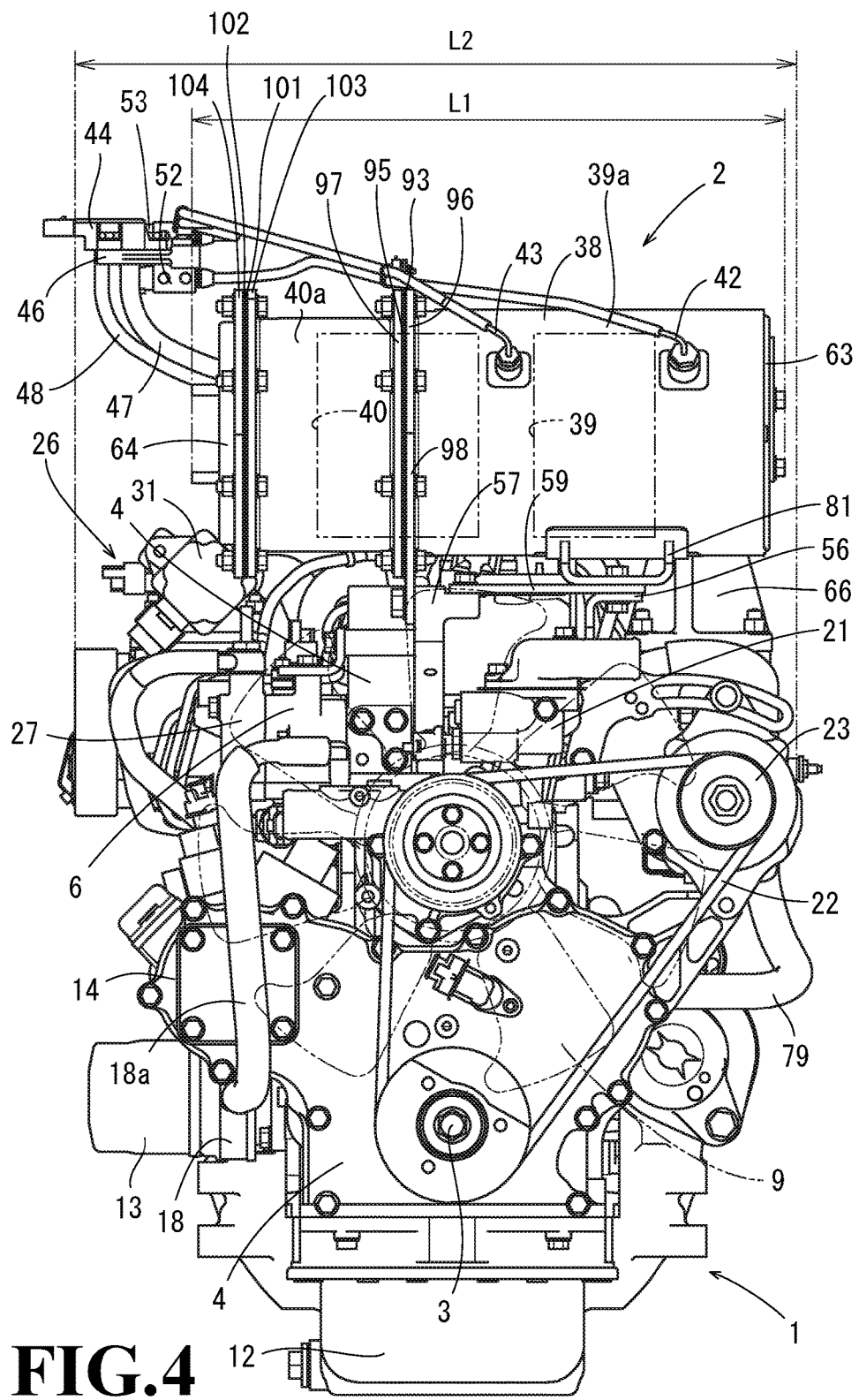
FIG. 4 is a front elevational view of the engine.
Figure 5:
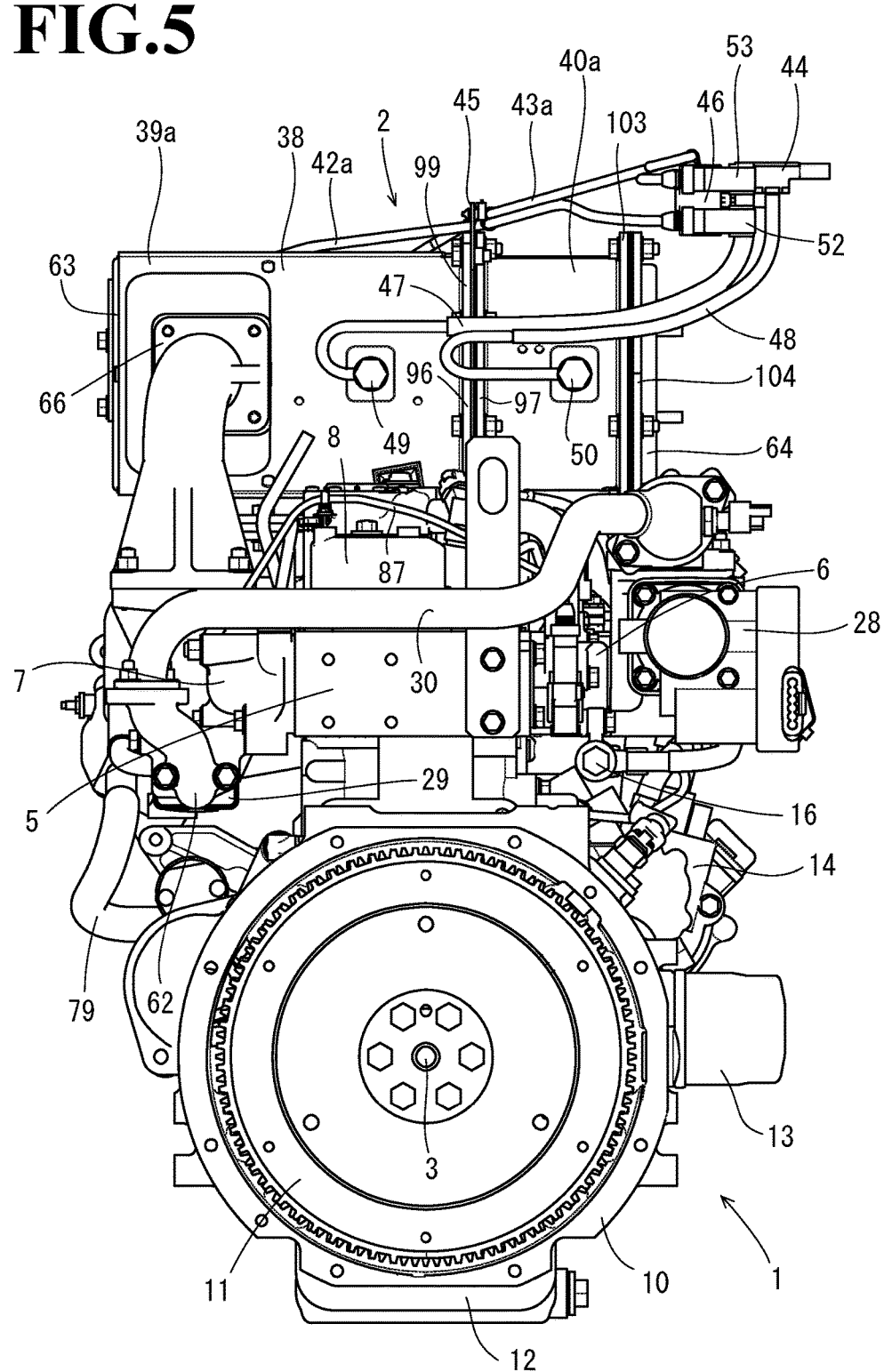
FIG. 5 is a back elevational view of the engine.
Figure 6:
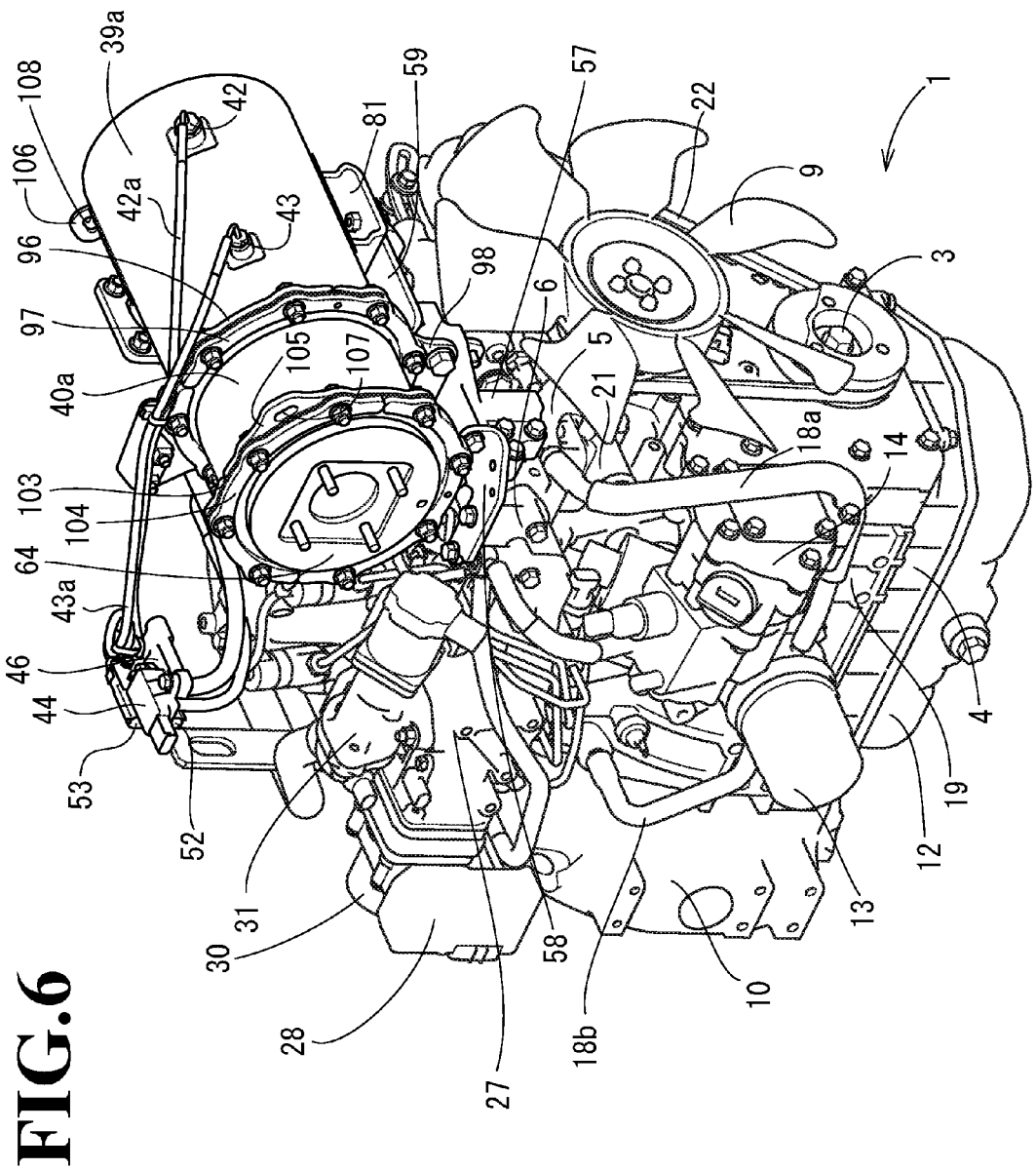
FIG. 6 is a front elevational perspective view of the engine.
Figure 7:
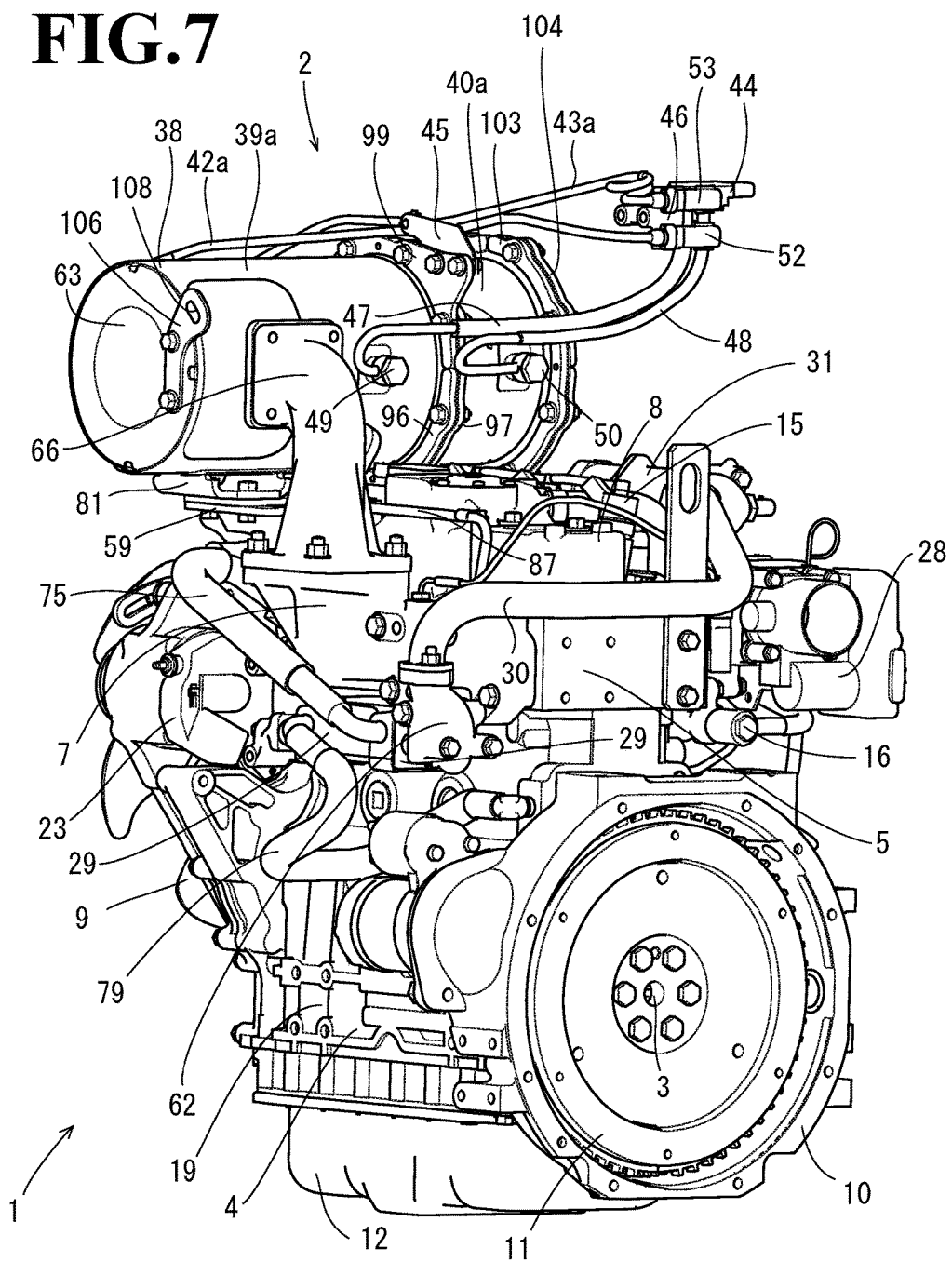
FIG. 7 is a back elevational perspective view of the engine.
Figure 8:
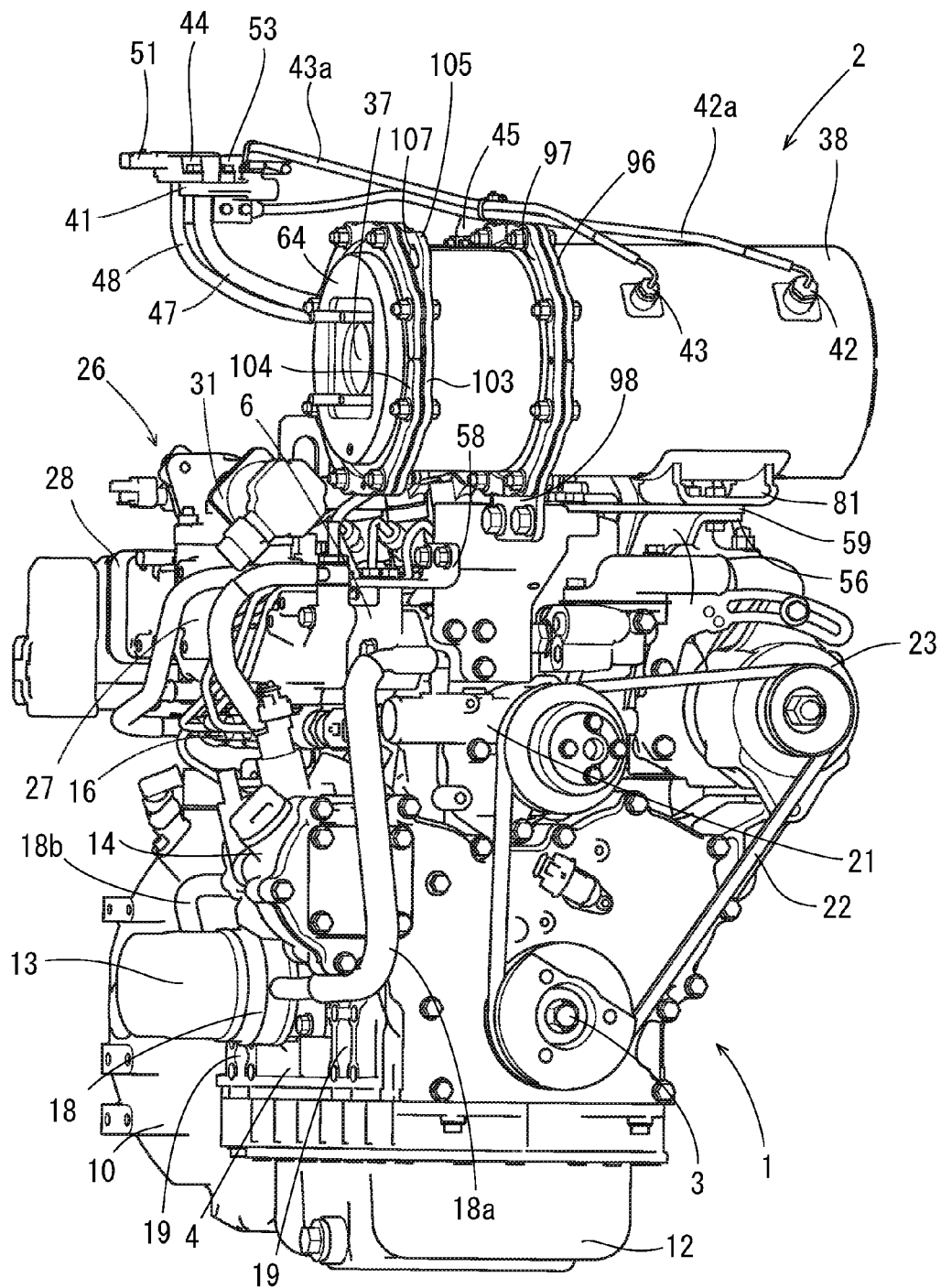
FIG. 8 is a front elevational perspective view of the engine in a state in which a cooling fan is detached therefrom.
Figure 9:
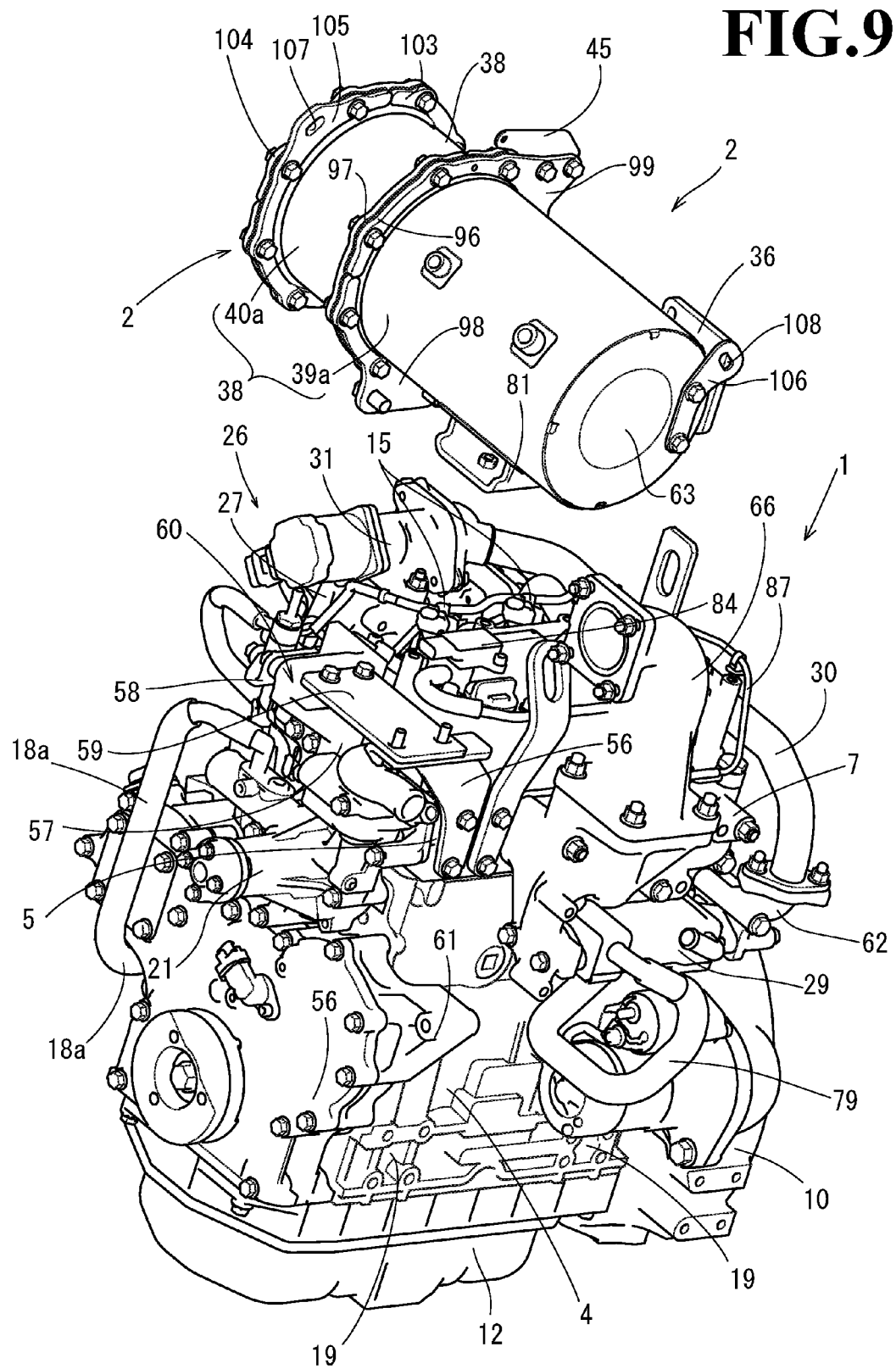
FIG. 9 is an explanatory view of an assembly (a disassembly) of an exhaust gas purification device which is mounted to the engine.
Figure 10:
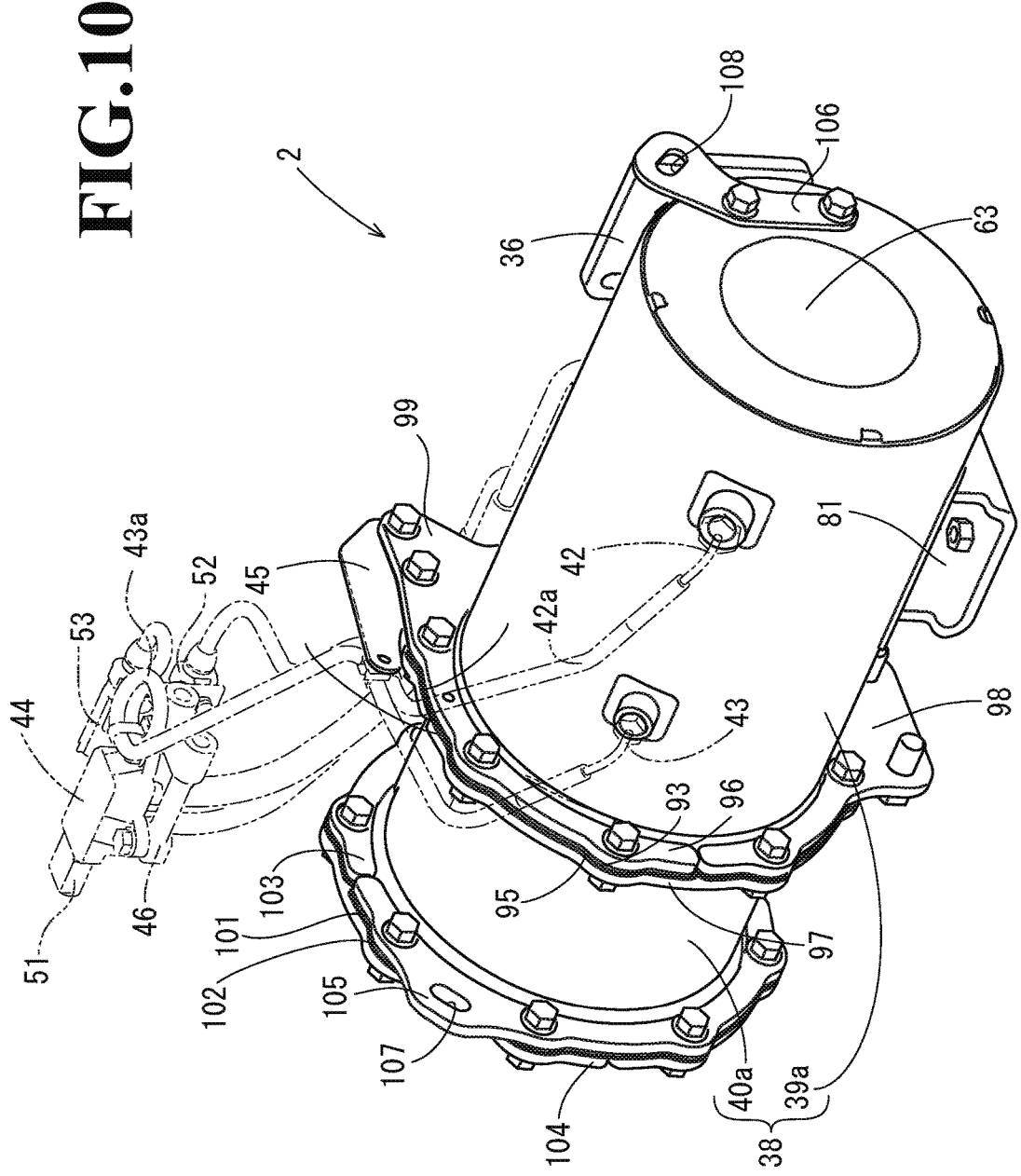
FIG. 10 is a perspective view of an outer appearance of the exhaust gas purification device.

As shown in FIG. 4, the exhaust gas purification device 2 is positioned within an installation width L2 of the alternator 23 serving as the power generator and the EGR device 26 and above the cooling water pump 21, in the front view. More specifically, a length L1 in the longitudinal direction of the exhaust gas purification device 2 is smaller than the installation width L2 corresponding to a total width of the engine 1. Further, the exhaust gas purification device 2 is positioned above the cooling water pump 21 in a state of being within the installation width L2 corresponding to the total width of the engine 1. As a result, the engine 1 can be adapted to have the total width which is held down as low as possible, even in the engine 1 in which the exhaust gas purification device 2 is assembled, thereby contributing to the compact structure of the engine 1 in this regard.

Next, a description will be given of the structure with which the exhaust gas purification device 2 is assembled in the engine 1, with reference to FIGS. 1 to 9, FIG. 13 and FIG. 14. The relay pipe (the exhaust gas discharge pipe) 66 is fastened by bolts to the exhaust gas outlet of the exhaust manifold 7, and the purification inlet pipe 36 of the exhaust gas purification device 2 (the exhaust gas purification case 38) is fastened by bolts to the relay pipe 66. The exhaust gas in the exhaust manifold 7 is supplied to the exhaust gas purification device 2 via the relay pipe 66. The relay pipe 66 also functions as a casing support body which supports the exhaust gas purification device 2.

Further, the engine 1 is provided with an inlet side bracket body 56 and an outlet side bracket body 57 for supporting and fixing the exhaust gas purification device 2. A lower end side of the inlet side bracket body 56 is fastened by bolts to a front portion in a left side surface of the cylinder head 5. A lower end side of the outlet side bracket body 57 is fastened by bolts to a front surface side of the cylinder head 5, and a vertically intermediate portion of the outlet side bracket body 57 is fastened by bolts to an upper surface of the intake manifold 6 via a connection bracket 58. The inlet side bracket body 56 and the outlet side bracket body 57 are provided in a rising manner in a front side of the cylinder head 5. A reinforcing plate portion 59 is provided in an upper end side of the inlet side bracket body 56. An upper end of the inlet side bracket body 56 and an upper end of the outlet side bracket body 57 are installed by the reinforcing plate 59.

A receiver bracket (a fixed leg body) 81 fixed by welding to the exhaust gas downstream side in the outer peripheral surface of the exhaust gas purification case 38 is fastened by bolts to a base end portion (a left end portion) of the reinforcing plate portion 59 which is fixed to the upper end side of the inlet side bracket body 56. The upper end side of the outlet side bracket body 57 is fastened by bolts to the intermediate pinching flange 96 of the exhaust gas purification case 38. More specifically, the upper end side of the outlet side bracket body 57 is attached by bolt fastening to the support body fastening portion 98 with through hole which is provided in the other circular arc body of the intermediate pinching flange 96. The exhaust gas purification device 2 (the exhaust gas purification case 38) is supported to the cylinder head 5 of the engine 1 by the inlet side bracket body 56 and the outlet side bracket body 57.

The support member 60 of the exhaust gas purification case 38 is constructed by the inlet side bracket body 56, the outlet side bracket body 57 and the reinforcing plate 59, and is coupled to the cylinder head 5. Since the support member 60 forms a space between the support member 60 and the upper surface of the cylinder head 5, the cooling air from the cooling fan 9 can flow toward the head cover 8 through the space, and can cool the upper portion of the diesel engine 1. Since the reinforcing plate 59 is formed into a surface shape which is parallel to the upper surface of the cylinder head 5, the temperature reduction of the exhaust gas purification device 2 is suppressed by blocking the flow of the cooling air from the cooling fan 9 toward the exhaust gas purification device 2. Further, the cooling water pump 21 is cooled by the cooling air from the cooling fan 9 by being arranged in the lower side of the reinforcing plate 59 so as to face to the cooling fan 9.

As is apparent from the description mentioned above, the exhaust gas purification device 2 is supported to the cylinder head 5 at the position which is closer to the cooling fan 9 in the upper surface side of the engine 1. Accordingly, the exhaust gas purification device 2 can be supported with the high rigidity by using the cylinder head 5 which is the part having the high rigidity in the engine 1, while the exhaust gas purification device 2 can be shipped after being assembled in the engine 1, so that it is possible to prevent the exhaust gas purification device 2 from being damaged by the vibration and the like.

Further, the exhaust gas purification device 2 can be communicated with the exhaust manifold 7 at close range, the exhaust gas purification device 2 can be easily maintained at the appropriate temperature, and the high exhaust gas purification performance can be maintained. As a result, it is possible to contribute to the downsizing of the exhaust gas purification device 2. Further, since the exhaust gas purification device 2 is arranged at the position which is close to the cooling fan 9 in the upper surface side of the engine 1, the upper surface side of the cylinder head 5, the intake manifold 6, and the exhaust manifold 7 can be exposed in the wide range, and the maintenance work relevant to the engine 1 can be easily carried out.

As is apparent from the description mentioned above, the exhaust gas purification device 2 is positioned between the head cover 8 and the cooling fan 9 on the cylinder head 5. Accordingly, the exhaust gas purification device 2 can be arranged by effectively utilizing the dead space which exists between the head cover 8 and the cooling fan 9 in the upper surface side of the engine 1. Therefore, the engine 1 can be adapted to have the total height which is held down as low as possible, even in the engine 1 in which the exhaust gas purification device 2 is assembled, and the compact structure of the engine 1 can be achieved.

Figure 15:
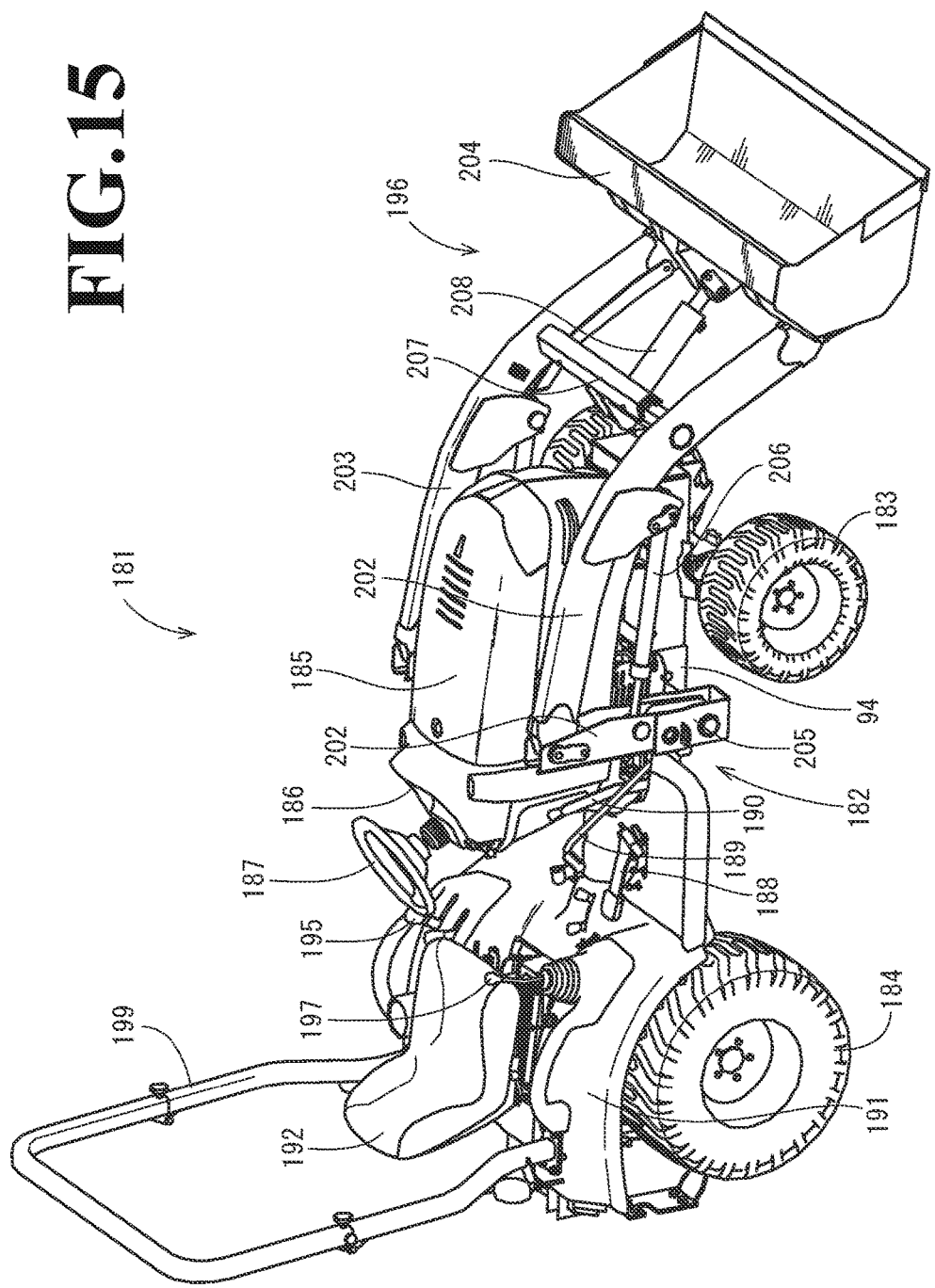
FIG. 15 is a perspective view of a working vehicle (a tractor) which is an example of a working machine mounting a diesel engine thereto.
Figure 16:
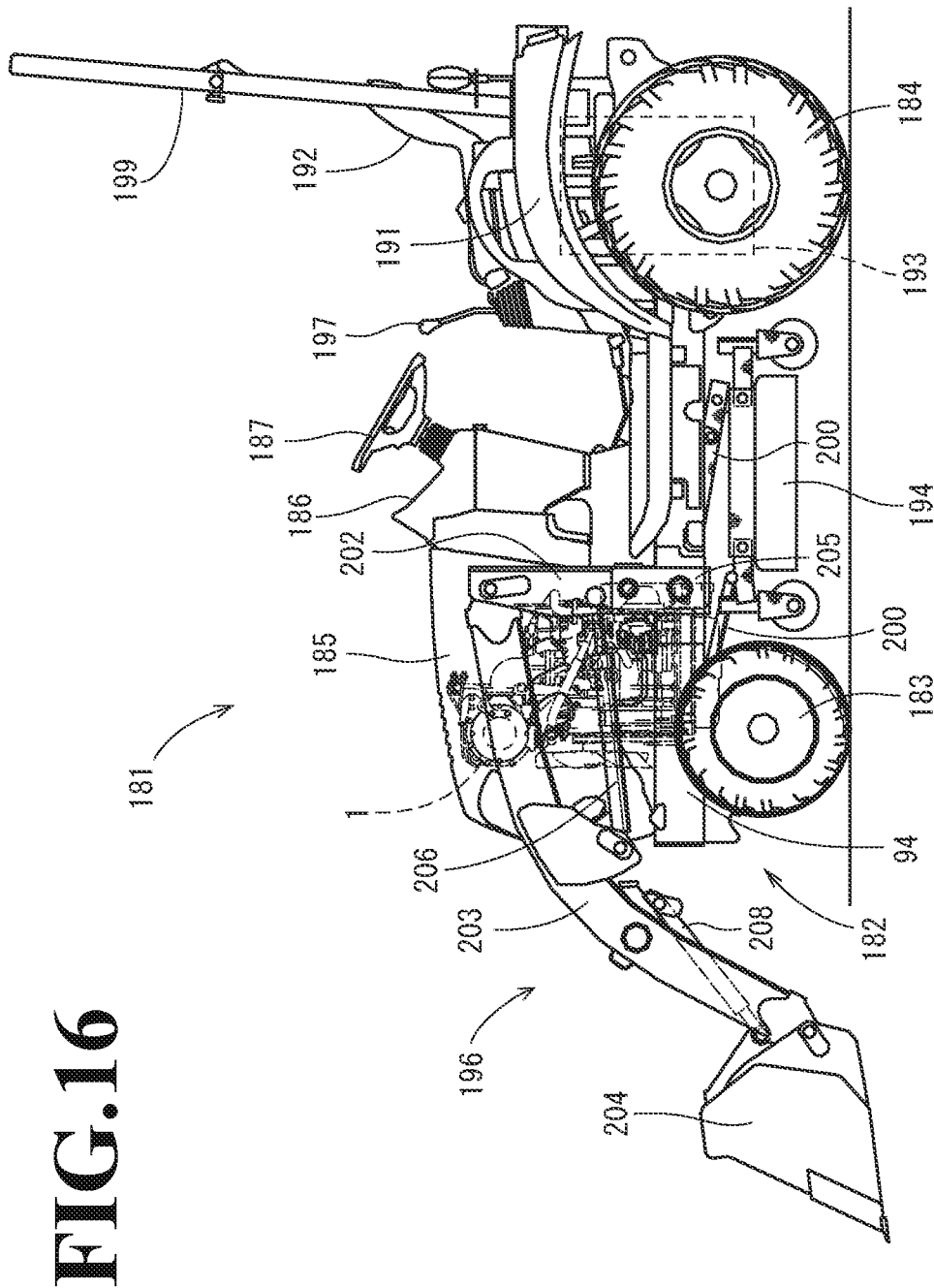
FIG. 16 is a left side elevational view of the working vehicle.
Figure 17:
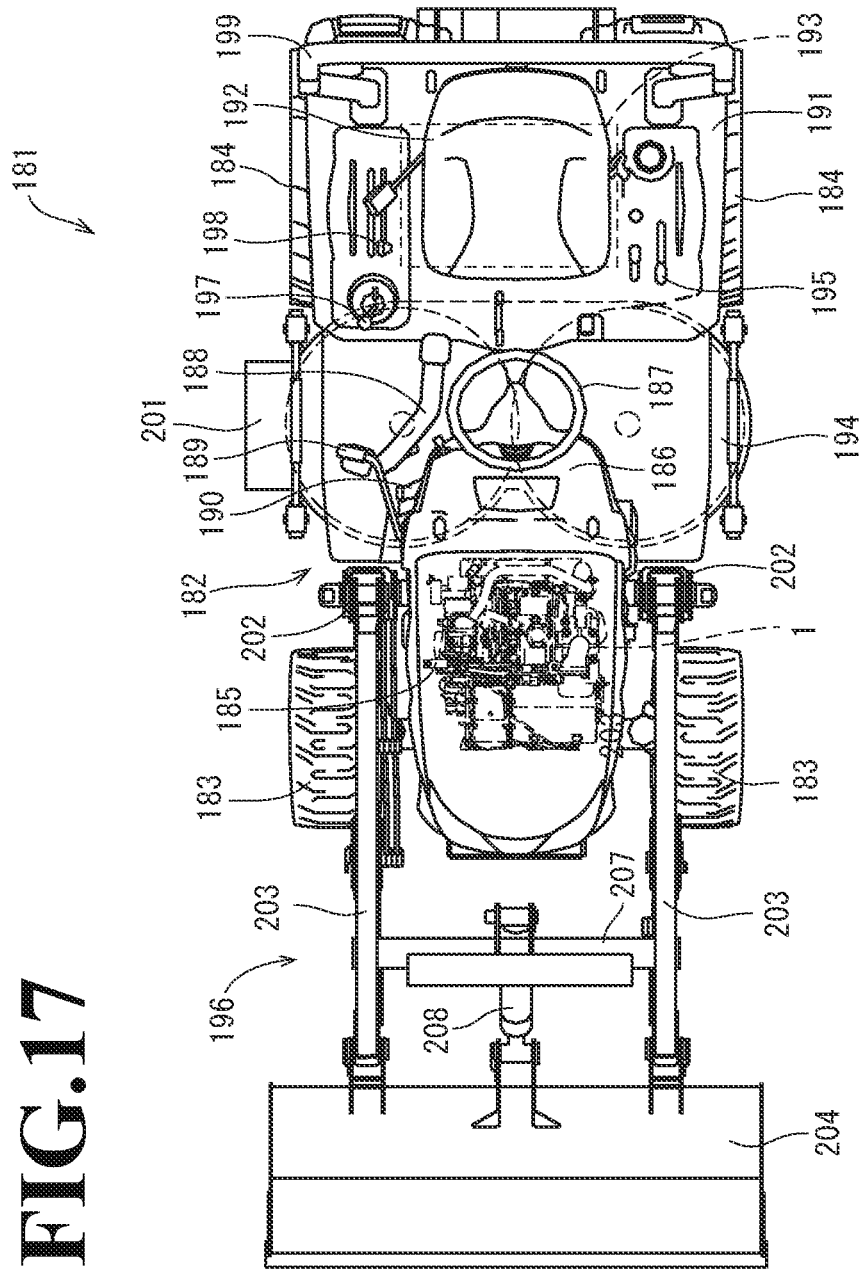
FIG. 17 is a plan view of the working vehicle.

A description will be given below of a working vehicle which mounts the diesel engine 1 thereon with reference to FIGS. 15 to 17. FIGS. 15 to 17 are explanatory views of a working vehicle (a tractor) which is equipped with a loader, a mowing device, and the like. In the following description, a left side in a direction toward a forward moving direction of a working vehicle 181 is simply referred to as a left side, and a right side in a direction toward the forward moving direction is simply referred to as a right side in the same manner. Further, illustration of a mower device (a mowing device) is omitted in FIG. 15.

A travel vehicle body 182 of the working vehicle 181 is provided with the machine body frame 94 obtained by connecting like a ladder a pair of right and left main frames which are long back and forth, and a plurality of cross rail frames which extend right and left. The machine body frame 94 is supported by right and left front wheels 183 and right and left rear wheels 184 which are arranged back and forth in both the right and left sides and serve as a traveling portion. The engine 1 serving as the power source is mounted to the front portion of the machine body frame 94. The working vehicle 181 is adapted to travel forward and backward by driving the front wheels 183 and the rear wheels 184 by the engine 1. The engine 1 is covered with a hood 185.

A control column portion 186 having a control steering wheel 187 is arranged in a rear portion of an upper surface of the hood 185. In this case, a steering angle (a control angle) of both the right and left front wheels 183 is adapted to be changed in correspondence to an amount of operation (an amount of rotation) when the control steering wheel 187 is rotationally operated. A transmission pedal 188, a brake lever 189, and a parking brake lever 190 are arranged below the control column portion 186, the transmission pedal 188 serving as a transmission operating means for operating to increase and decrease a forward and backward moving speed of the travel vehicle body 182, the brake lever 189 being provided for operating to brake both the right and left rear wheels 184, and the parking brake lever 190 serving as a parking brake operating means for operating to keep a braking state of both the right and left rear wheels 184.

A control seat 192 adapted to be changeable in its front-back direction is provided on a rear cowl 191 which covers a rear portion of an upper surface of the travel vehicle body 182. A PTO lever 195 and the like is arranged in a left side of the control seat 192, the PTO lever 195 serving as a PTO operating means for operating to connect and disconnect the power transmission from a transmission case 193 to a mower device 194. A loader lever 197 for operating a front loader 196, an accelerator lever 198 for accelerating and decelerating the rotating speed of the engine 1, and the like are arranged in a right side of the control seat 192. A ROPS frame 199 for protecting an operator when the travel vehicle body 182 is inverted is provided in a rear side of the control seat 192.

The transmission case 193 is arranged in a rear portion of the machine body frame 94, the transmission case 193 being provided for appropriately changing speed of the power from the engine 1 and transmitting the power to the front wheels 183, the rear wheels 184, and the like. The mower device 194 for lawn mowing is installed between the front wheels 183 and the rear wheels 184 in a lower portion of the travel vehicle body 182 so as to be movable up and down via a pair of front and rear link levers 200. The mower device 194 is provided within a mower case having a downward opening bowl shape, with a pair of rotary cutting blades (not shown) which can rotate horizontally. A discharge duct 201 for discharging cut grass is formed in a transversely one side portion of the mower device 194 so as to be open outward. The cut grass cut by the rotary cutting blade is discharged to a transverse direction of the travel vehicle body 182 from the discharge duct 201 by utilizing conveying wind which is generated by the rotation of the rotary cutting blade.

The front loader 196 is provided in a front portion of the travel vehicle body 182. The front loader 196 has loader posts 202 which are arranged both right and left sides across the hood 185, a pair of right and left lift arms 203 which are coupled to an upper end of each of the loader posts 202 so as to freely oscillate up and down, and a bucket 204 which is coupled to leading end portions of both the lift arms 203 so as to freely oscillate up and down.

Each of the right and left loader posts 202 is provided in a rising manner in a post support member 205 which is protruded outward right and left from an intermediate portion in the front-back direction of the machine body frame 94. A lift cylinder 206 for oscillating up and down the lift arm 203 is provided between each of the loader posts 202 and the corresponding lift arm 203. A bucket cylinder 208 for oscillating up and down the bucket 204 is provided between a transverse frame 207 connecting the longitudinally intermediate portions of both the lift arms 203 and the bucket 204.

In this case, both the lift arms 203 and the bucket 204 are oscillated up and down by actuating to extend and contract both the lift cylinders 206 and the bucket cylinders 208 on the basis of the operation of the loader lever 197 which is provided in the right side of the control seat 192. The operation of the loader lever 197 can be carried out in a state of seating on the forward directed control seat 192.

The present invention is not limited to the embodiment mentioned above, but can be embodied into various aspects. For example, the engine device according to the present invention is not limited to the forklift car 120 and the wheel loader 211 as mentioned above, but can be widely applied to various working machines such as an agricultural machine, for example, a combine harvester and a tractor, and a vehicle for special work, for example, a crane vehicle. Further, the structure of each of the portions in the present invention is not limited to the illustrated embodiment, but can be variously modified within the range which does not depart from the scope of the present invention.

The embodiments of the present invention relates to an engine device such as a construction machine (a bulldozer, a hydraulic excavator, or a loader) or an agricultural machine (a tractor or a combine harvester) on which a diesel engine is mounted, or a power generator or a compressor, and more particularly to an engine device in which an exhaust gas purification device removing particulate matter (soot) and the like contained in exhaust gas is installed.

What is claimed is:

1. An engine device comprising:
   an engine;
   an exhaust gas purification device positioned adjacent to the engine for purifying exhaust gas from the engine, the exhaust gas purification device comprising a first end surface and a second end surface at opposite longitudinal ends of the exhaust gas purification device;
   a temperature sensor attached to the exhaust gas purification device;
   electric parts which detect a state of the exhaust gas purification device and which comprise a differential pressure sensor and a wiring connector which is electrically connected to the temperature sensor, wherein at least portions of the electric parts are spaced from the exhaust gas purification device on an extension which partially extends along a longitudinal direction of the exhaust gas purification device, and the at least portions of the electric parts intersect a plane defined by the first end surface or the second end surface;
   an exhaust manifold connected to the exhaust gas purification device, wherein the exhaust manifold is provided on a first side surface of the engine device;
   an exhaust gas introduction portion connecting the exhaust gas purification device and the exhaust manifold;
   an exhaust gas purification case comprising a case outer surface defined by the first end surface and the second end surface, wherein the at least portions of the electric parts are arranged at a position which is outside the case outer surface, and wherein the at least portions of the electric parts are farther from the engine than the case outer surface;
   a flange on the exhaust gas purification case; and
   a wiring having an intermediate portion fixed to the flange, wherein the wiring connects the temperature sensor and the wiring connector.

2. The engine device according to claim 1, further comprising:
a cooling fan provided on a first side surface of the engine,
an output shaft, and
a cylinder head,
wherein an end of the output shaft is present on the first side surface of the engine, the exhaust gas purification device is supported on the cylinder head in an upper surface side of the engine, and a distance between the exhaust gas purification device and the cooling fan is less than a distance between the exhaust gas purification device and the output shaft.

3. The engine device according to claim 1, wherein the exhaust gas purification device comprises a diesel oxidation catalyst and/or a soot filter.

* * * * *